US012668000B2

(12) United States Patent
Romanov

(10) Patent No.: US 12,668,000 B2
(45) Date of Patent: Jun. 30, 2026

(54) TOOL, TOOL SYSTEM AND METHOD FOR THE PRODUCTION OF PARTICLE FOAM PARTS

(71) Applicant: adidas AG, Herzogenaurach (DE)

(72) Inventor: Victor Romanov, Kreuzwertheim (DE)

(73) Assignee: adidas AG, Herzogenaurach (DE)

( * ) Notice: Subject to any disclaimer, the term of this patent is extended or adjusted under 35 U.S.C. 154(b) by 36 days.

(21) Appl. No.: 18/623,898

(22) Filed: Apr. 1, 2024

(65) Prior Publication Data

US 2024/0246269 A1     Jul. 25, 2024

Related U.S. Application Data

(63) Continuation of application No. 17/070,673, filed on Oct. 14, 2020, now Pat. No. 11,975,465.

(30) Foreign Application Priority Data

Oct. 15, 2019    (DE) ......................... 102019215845.5
Oct. 5, 2020    (EP) ..................................... 20200146

(51) Int. Cl.
B29C 43/52        (2006.01)
A43B 13/04        (2006.01)
        (Continued)

(52) U.S. Cl.
CPC .............. B29C 43/52 (2013.01); A43B 13/04 (2013.01); B29C 35/0805 (2013.01);
        (Continued)

(58) Field of Classification Search
CPC ..... B29C 43/36; B29C 43/02; B29C 35/0805; B29C 43/52
See application file for complete search history.

(56) References Cited

U.S. PATENT DOCUMENTS 3,079,723 A    3/1963    Roes
3,242,238 A    3/1966    Edberg et al.
        (Continued)

FOREIGN PATENT DOCUMENTS

CN    104302456    1/2015
CN    205255385    5/2016
        (Continued)

OTHER PUBLICATIONS

Benkert, "Einfürhung in die Technische Keramik (Introduction to Technical Ceramics)", available at http://www.keramverband.de/ keramik/pdf/02/sem02_03.pdf at least as early as Oct. 15, 2019, 49 pages (no English translation available).
        (Continued)

*Primary Examiner* — Stella K Yi
(74) *Attorney, Agent, or Firm* — Kilpatrick Townsend & Stockton LLP

(57)        ABSTRACT

The present invention relates to a tool, a tool system and a method for the production of particle foam parts, in particular for the manufacture of shoe soles. The shoe sole may be manufactured by welding foam particles using electromagnetic waves. The tool may comprise two mold halves forming a mold cavity corresponding to the shape of the shoe sole. The tool may be arranged between two capacitor plates. The mold cavity may be filled with the foam particles. The tool may then be closed and subjected to electromagnetic waves, in particular radio waves or microwaves, introduced into the mold cavity via the capacitor plates. The foam particles heated by the electromagnetic waves and at least partially fuse or bake together.

20 Claims, 22 Drawing Sheets

(51) Int. Cl.

| | |
|---|---|
| *B29C 35/08* | (2006.01) |
| *B29C 43/02* | (2006.01) |
| *B29C 43/36* | (2006.01) |
| *B29K 105/00* | (2006.01) |
| *B29K 105/04* | (2006.01) |
| *B29L 31/50* | (2006.01) |

(52) U.S. Cl.
CPC .............. *B29C 43/02* (2013.01); *B29C 43/36* (2013.01); *B29K 2105/04* (2013.01); *B29K 2105/251* (2013.01); *B29L 2031/504* (2013.01)

(56) References Cited

U.S. PATENT DOCUMENTS

| | | | |
|---|---|---|---|
| 4,296,053 | A | 10/1981 | Doerer et al. |
| 4,441,876 | A | 4/1984 | Marc |
| 4,851,167 | A | 7/1989 | Marc |
| 2009/0226696 | A1 | 9/2009 | Simpson |
| 2014/0176390 | A1 | 6/2014 | Ko et al. |
| 2014/0243442 | A1 | 8/2014 | Coles et al. |
| 2014/0373717 | A1 | 12/2014 | Wang |
| 2015/0011666 | A1 | 1/2015 | McEvoy |
| 2016/0227876 | A1 | 8/2016 | Le et al. |
| 2018/0154598 | A1 | 6/2018 | Kurtz |
| 2021/0206036 | A1 | 7/2021 | Romanov |

FOREIGN PATENT DOCUMENTS

| | | |
|---|---|---|
| CN | 108472843 | 8/2018 |
| CN | 110099778 | 8/2019 |
| CN | 110114198 | 8/2019 |
| CN | 110154305 | 8/2019 |
| DE | 102004049060 | 6/2005 |
| DE | 102016100690 | 7/2017 |
| DE | 102017205830 | 10/2018 |
| DE | 102017128895 | 6/2019 |
| EP | 0159368 | 10/1985 |
| GB | 1403326 | 8/1975 |
| WO | 0164414 | 9/2001 |
| WO | 2005/019310 | 3/2005 |
| WO | 2013050581 | 4/2013 |
| WO | 2017127310 | 7/2017 |
| WO | 2017127312 | 7/2017 |
| WO | 2018/095572 | 5/2018 |
| WO | 2018099833 | 6/2018 |
| WO | 2018100169 | 6/2018 |
| WO | 2018100713 | 6/2018 |

OTHER PUBLICATIONS

German Patent Application No. 2019215845.5, Office Action, May 12, 2020, 12 pages (English machine translation provided).

Wikipedia, "Permitivity", available at https://de.wikipedia.org/wiki/Permittivitat at least as early as Oct. 15, 2019, 12 pages.

European Application No. 20200146.7, Extended European Search Report mailed Mar. 23, 2021, 8 pages.

Chinese Application No. 202011102928.2, Office Action mailed on Mar. 9, 2022, 20 pages (11 pages of Original Document and 9 pages of English Translation).

Office Action, German Patent Application No. 102019215845.5, Oct. 6, 2022, 9 pages.

Office Action, European Patent Application No. 20200146.7, May 11, 2023, 5 pages.

Office Action, European Patent Application No. 20200146.7, Feb. 7, 2024, 5 pages.

Non-Final Office Action, U.S. Appl. No. 17/070,673, filed Jul. 20, 2022, 9 pages.

Final Office Action, U.S. Appl. No. 17/070,673, filed Feb. 3, 2023, 9 pages.

Non-Final Office Action, U.S. Appl. No. 17/070,673, filed Jul. 6, 2023, 11 pages.

Final Office Action, U.S. Appl. No. 17/070,673, filed Oct. 11, 2023, 10 pages.

Notice of Allowance, U.S. Appl. No. 17/070,673, filed Jan. 4, 2024, 5 pages.

European Extended Search Report, European Patent Application No. 25170632.1, Jun. 17, 2025, 8 pages.

TOOL, TOOL SYSTEM AND METHOD FOR THE PRODUCTION OF PARTICLE FOAM PARTS

CROSS REFERENCE TO RELATED APPLICATION

This application is a continuation of U.S. patent application Ser. No. 17/070,673, filed Oct. 14, 2020, entitled "Tool, Tool System and Method for the Production of Particle Foam Parts" ("the '673 application"), which is related to and claims priority benefits from German Patent Application No. 102019215845.5, filed on Oct. 15, 2019 ("the '845 application"), and European Patent Application No. 20200146.7, filed on Oct. 5, 2020 (the '146 application"). The '673, '845, and '146 applications are hereby incorporated herein in their entirety by this reference.

FIELD OF THE INVENTION

The present invention relates to a tool, a tool system and a method for the production of particle foam parts. A particular field of application of the present invention is the manufacture of shoe soles, in particular insoles or midsoles, from foam particles (which may also be called particles of expanded material), and the use of such soles in shoes, in particular in sports shoes like running shoes. The tool, tool system and method for the production of particle foam parts make use of electromagnetic waves, wherein foam particles are welded into a particle foam part (e.g., a shoe sole) by means of the electromagnetic waves. The energy required for welding is applied to the foam particles by means of the electromagnetic waves.

BACKGROUND

For a long time now, attempts have been made to weld foam particles into particle foam parts by means of electromagnetic waves. Relevant methods are disclosed for example by U.S. Pat. Nos. 3,079,723, 3,242,238 and GB 1,403,326.

Described in U.S. Pat. No. 3,079,723 is a method for the sintering of moist thermoplastic foam particles. The particles are heated dielectrically and simultaneously compacted in the mold. Electromagnetic waves with a frequency of around 2 to 1000 MHz are applied.

A similar method is disclosed by U.S. Pat. No. 3,242,238, in which foam particles are wetted with an aqueous solution and subjected to an electromagnetic field with a frequency of around 5 to 100 MHz.

Described in GB 1,403,326 is a method for the welding of expandable polystyrol foam particles, in which the particles are wetted with an aqueous solution and subjected to an electromagnetic field of 5 to 2000 MHz.

Considerable efforts have also been made in recent decades to weld foam particles using electromagnetic waves. Relevant methods are described in WO 01/064414 A1 and WO 2013/050581 A1.

WO 01/064414 A1 discloses a method in which polymer particles of polyolefins, which are wetted by a liquid medium, are heated by electromagnetic waves, in particular microwaves. Here the temperature in the mold is regulated by control of its internal pressure.

Described in WO 2013/050581 A1 is a method for the production of particle foam parts is which a mixture of foam particles and dielectric transfer fluid is heated by means of electromagnetic waves, in order to fuse the foam particles into a particle foam part. Radio waves or microwaves are used as electromagnetic waves. The material of the foam particles is made of polypropylene (PP).

Despite these long, sustained and considerable efforts, there are no machines on the market for the welding of foam particles using electromagnetic waves. Only machines for welding foam particles using steam are in commercial use.

There are no machines for the welding of foam particles at the series production stage, even though the associated benefits have long been known. These are in particular: (1) more efficient energy input; (2) after welding, the foam particles are dry, and may immediately be used in further processing; (3) heating is from the inside to the outside, so that the inner zone of the foam particles may be significantly better welded, and (4) equipment for the generation of steam, which is much more expensive than a generator of electromagnetic waves, may be dispensed with.

BRIEF DESCRIPTION OF THE FIGURES

The invention is explained in detail below by way of example, with the aid of the drawings, which show in.

SUMMARY

Figure 1:
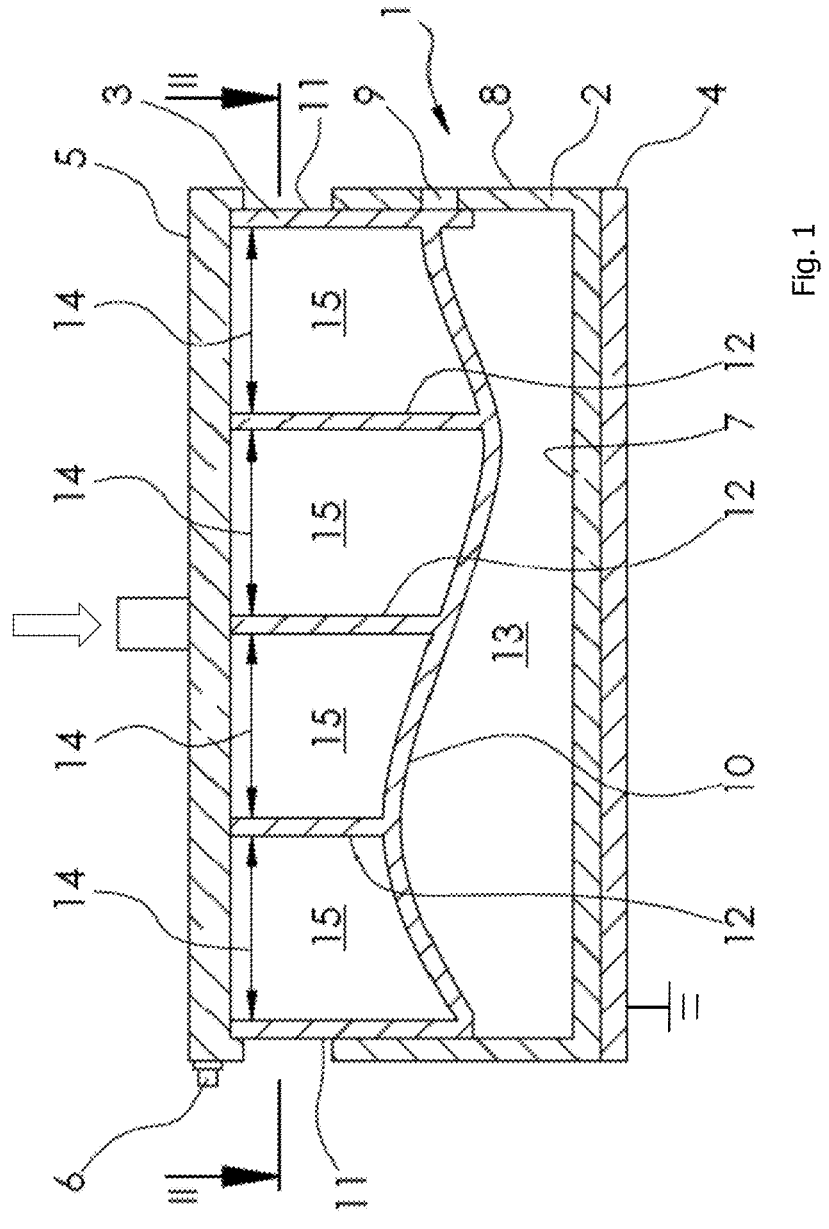
FIG. 1: a sectional view of embodiments of a tool with two mold halves, in a closed position.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The applicant for the present patent application has developed apparatus for the welding of foam particles using electromagnetic waves, and the corresponding method, to the point where it is in a position to produce fairly large quantities of foam particles by means of prototypes close to series production standard, through welding of foam particles by means of electromagnetic waves. These apparatus variants and methods are based on the technology described in WO 2017/127310 A1, WO 2017/127312 A1 and WO 2018/100713 A2, to which reference is made to the full extent in terms of their disclosed content, also in connection with the invention described below and in particular, additionally but not exclusively, relating to the apparatus variants and methods plus materials.

Herewith there has been success in obtaining uniform welding in particle foam parts using different molds. The more complex the mold of the particle foam part, the more difficult it is to achieve uniform welding of the foam particles. For decades it has been known that such foam particles in a plastic cup with some water may be placed in a conventional domestic microwave oven, and a good even welding may be achieved. If however the particle foam parts to be produced are larger or more complex in form or strongly contoured or of irregular thickness (measured in a direction perpendicular to the capacitor plates, i.e. in the direction of propagation of the electromagnetic field)—as may, for example, be the case in the production of shoe soles—then it is difficult to obtain a uniform distribution of the electromagnetic field in all places. The problems have a wide variety of causes. On the one hand, electromagnetic waves do not in principle have the same energy density throughout. The shorter the wavelength, the greater the local fluctuations. On the other hand, electromagnetic waves are influenced by the material of the tool bounding the mold cavity. Here there are various effects. On the one hand, some of the energy of the electromagnetic waves may be absorbed by the material of the molding tool. On the other hand, this material functions as a dielectric which is polarised in such a way that an electromagnetic field opposite to the electromagnetic waves is generated. Through this, the energy density of the electromagnetic waves is shifted and may be concentrated locally in the mold cavity. The inventor of the present invention has taken this into account for the first time in development of the present invention.

Furthermore, the material of which the foam particles are made may have an effect on the electromagnetic field, so that, with use of different materials, the same tool acts in a different way.

In the RF foaming of complex geometries, e.g., shoe soles, it is therefore desirable for the electrical field to be as constant or uniform as possible in all areas of the molding. There are suggestions for achieving this for example by deformation of electrodes and variation of tool wall thickness. However, this is linked to the application of very complex simulation programs. The problem here is that the relative permittivity of tool material and particle foam vary greatly, for example by a factor of 2 to 5.

A further problem lies in the fact that it is practically impossible to optimise the tools for RF foaming retrospectively, if for example the electrical field needs to be strengthened in some areas.

Since heating with an RF field proceeds from the inside to the outside, welding of outer particle layers is poorer than in the core, and the surface may remain rough. In order to improve this, heating and cooling channels have formerly been provided in the tool.

For technical process reasons it may be sensible for the foam particles to be fed into the mold cavity mixed with water as heat transfer medium. During welding, the water may then be pressed out of the mold cavity. By this means, the average relative permittivity in the mold cavity may vary and with it also the local electrical field strength. Control of such a process is difficult.

In an apparatus for the production of particle foam parts, the aim is to produce different particle foam parts. For this purpose, one must change over the relevant tools which define a mold cavity in which the particle foam parts are molded. This is already well-known from conventional apparatus for the production of particle foam parts, in which the foam particles are welded using steam. The inventors of the present invention have however recognised that, other than in the welding of foam particles by means of steam, in welding by means of electromagnetic waves the function of a tool depends on the shape, which is pre-set by the shape of the particle foam part to be produced. This is one of the main reasons why, despite the most intensive experiments and development efforts over decades, there has been no success in developing apparatus suitable for series production for the welding of particle foam parts by means of electromagnetic waves, in particular parts with an irregular shape or thickness or strong contouring like, for example, shoe soles.

The invention is therefore based on the problem of creating a tool for the production of particle foam parts, together with a corresponding tool system, by which foam particles may be welded by means of electromagnetic waves, reliably and with high quality, in a simple manner.

A problem of the present invention is in particular to specify a tool, a tool system and a method which avoid the above-mentioned disadvantages and problems, or at least improve them.

A further problem of the present invention is to provide scope for retrospective optimisation of such a tool.

A further problem of the present invention is to improve a tool, a tool system and a method in respect of uniform quality of welding in the cross-section of the particle foam part.

A further problem of the present invention is to provide scope for balancing out any change in relative permittivity in the mold cavity during the foaming process, and/or to influence during the foaming process the electromagnetic field prevailing in the mold cavity, in particular in respect of electrical field strength.

A further problem addressed by the present invention is to provide improved ways of manufacturing shoe soles, for example insoles or midsoles.

Further prior art is disclosed in U.S. Pat. Nos. 4,851,167 A, 4,296,053 A, DE 10 2017 205 830 A1, WO 2018/099 833 A1 and DE 10 2016 100 690 A1.

At least one of the stated problems is or are solved by the subjects of the independent patent claims. Desirable developments are set out in the respective dependent claims.

The tool according to the invention for the production of particle foam parts through the welding of foam particles by means of electromagnetic waves includes two mold halves which bound a mold cavity. At least one of the two mold halves is made of a material which is transparent to electromagnetic waves and has a boundary wall which bounds the mold cavity and at least one support serving to support the boundary wall on a capacitor plate on the side facing away from the mold cavity and forming at least one hollow spaces of the mold half.

Due to the forming of hollow spaces on the side of the boundary wall facing away from the mold cavity, mold halves of any desired shape may be realised with a minimum of material. The influencing of the electromagnetic field in the mold cavity by the material of the mold half may therefore be limited. Surprisingly, simulations such as tests have revealed that the supports cause hardly any discontinuity or lack of homogeneity of field strength in the mold cavity. Instead, the field strength between areas corresponding to the supports and areas corresponding to the hollow spaces averages out and this averaging out or even-ness continues into the mold cavity. It is therefore possible in a simple manner to produce mold halves with similar dielectric properties to the object to be produced. In particular, harmonisation of the dielectric properties of the mold half to the particle foam part is possible in a surprisingly simple manner. When the dielectric properties of the mold half correspond roughly to those of the particle foam part, this also has the advantage that the electromagnetic field in the whole area between the capacitor plates is roughly homogenous, irrespective of the shape of the mold half or of the particle foam part.

Support of the capacitor plate by the supports may be effected directly or indirectly (i.e. with an intermediate layer). The supports may be realised by side walls and/or intermediate walls. The boundary wall and the supports may be made in one piece, in particular being monolithic. In the case of some molds, a capacitor plate already forms a boundary of the mold cavity. Naturally it is also possible for each of the two mold halves to be made of material which is transparent to electromagnetic waves, and to have the boundary wall and the support(s).

In some embodiments, the boundary wall of at least one mold half is made with substantially constant thickness.

The supports of at least one mold half run, in some embodiments, parallel to a press direction, by which the mold halves are pressed together by a press during operation.

The mold halves may have connections for a tempering medium, which is able to flow through the one or several hollow space(s).

At least one of the two mold halves may be designed for trimming the mold half by means of the at least one support(s) and/or the one or several hollow space(s), in order to influence an electromagnetic field in the mold cavity. It is thus possible to trim or adjust such a tool retrospectively, i.e. after its manufacture. By this means the tool may be adjusted individually. The tool may therefore on the one hand be matched to the electrical field provided by an apparatus for the production of particle foam parts. On the other hand, the distribution of the electrical field within the mold cavity may be adjusted individually, i.e. in certain areas the electrical field is intensified as compared with other areas if, adjacent to these areas, a trimming body is inserted in the hollow space of the mold half. By this means the electrical field in the tool may be matched to the geometry of the mold cavity.

Furthermore, the electrical field may be matched to the material from which the foam particles are made, which are to be welded into a particle foam part. Different materials from which the foam particles are made have differing effects on an applied electrical field. Thus it may be that the tool in a certain setting functions very well with a first material, but not with a second material. By replacing or modifying the arrangement of trimming bodies in the tool, the latter may be adapted to the second material.

To summarise it may be stated that the electrical field applied in the mold cavity is influenced by: the device which generates the electromagnetic field, as for example the signal generator and the capacitor plates for an RF field; the shape and material of the mold halves of the molding tool, also the material to be welded.

In principle there is the possibility of simulating the electrical field in a mold cavity. If however the tool is used in another apparatus to produce a particle foam part, or a different material is to be welded to produce it, then in certain circumstances the simulation is no longer suitable. The tool according to the invention may be trimmed or adjusted retrospectively and it may also be adapted subsequently to suitably changed circumstances (e.g. a different apparatus for production of a particle foam part or different material to be welded).

For trimming it is for example possible to introduce a dielectric material into the mold half. This dielectric material is polarised by applying an electrical field so that, in the dielectric material, an electrical field counteracting the electrical field is generated. By this means, the electrical field in the area of the mold cavity is concentrated and intensified, leading to an enhanced welding effect for welding the foam particles into a particle foam part.

In some embodiments, the mold half or mold halves has or have at least one opening leading into the hollow space, so that a trimming body may be inserted in the hollow space. The wall bounding the mold cavity is of course made without an opening. The opening may, in some embodiments, face the side facing away from the mold cavity but may also, in some embodiments, face to the side.

The hollow space or at least one of the several hollow spaces may have a shaped or latching element for positioning and/or fixing of a trimming body in the hollow space.

Alternatively or additionally, the mold half may have a connection for a trimming fluid which is connected to at least one of the at least one hollow spaces. With this, a trimming fluid may be fed through the hollow space or spaces or into the hollow space or out of the hollow space. In some embodiments, the hollow spaces are connected to one another for fluidic communication, so that the hollow spaces may be fed jointly via a single or a few, in particular two, connection for trimming fluid. On the other hand, at least partial volumes of several hollow spaces may be separated, fluid-tight, from one another, so that the hollow spaces or partial volumes thereof may be fed individually with trimming fluid. A partial volume may for example be bounded by a cover located in the hollow space. The cover may be mounted with variable height within the hollow space and may be biased and/or height-adjustable in one direction.

In addition, at least one connection may be provided for compressed air and/or vacuum, being connected to at least one of the at least one hollow spaces. With this, the hollow space or spaces may be supplied with compressed air or vacuum, in order for example to press out the trimming fluid from the hollow space or spaces or to suck it into the hollow space or spaces. In some embodiments, the connection or connections for compressed air inclination vacuum is or are arranged at a higher level than the connection or connections for trimming fluid, so that the trimming fluid can collect in the lower part of the hollow spaces and the compressed air or vacuum connection remains free. In some embodiments, the hollow spaces are connected through connection openings in the supports, with the connection openings or a group of connection openings being flush with at least one of the connections for tempering medium, trimming fluid, compressed air or vacuum. The connections for tempering medium, trimming fluid, compressed air or vacuum may be made in a side wall which closes the mold half at the side and acts as support. The connection openings may be made in bars which run between side walls and act as supports.

A further aspect of the present invention relates to a tool system for the production of particle foam parts, which includes the tool described above and at least one trimming body, which is designed for insertion in the hollow space or at least one of the hollow spaces, and/or has a trimming fluid provision unit which is designed to supply the mold half or halves with a trimming fluid.

The trimming body is, in some embodiments, made from a material with a relative permittivity (εr) of at least 2. The greater the relative permittivity of the material of the trimming body, the greater its effect as trimming body. Materials with a relative permittivity of at least 3 or at least 4 may therefore also be expedient. The smaller the relative permittivity of the material of the trimming body, the more precisely and finely the electrical fields in the mold cavity may be set. Materials with a low permittivity, for example less than 2, may therefore also be useful.

The trimming body may be in the form of a plug-in body, which may be fixed in the mold half by means of a latching element or by frictional locking. The trimming body may thus be replaced easily in the mold half, so that the mold half may be adapted to different production conditions.

The trimming body may be so designed that it fills only a part of the hollow space or spaces. In particular the trimming body is so arranged in the respective hollow space that it is, in some embodiments, remote from the mold cavity. By this means, the hollow space adjacent to the mold cavity is, as before, free and may be used for the through passage of a tempering medium.

The trimming body may be made of a solid body. In particular the trimming body may be made of a plastic body. The trimming body may however be made by filling at least one of the hollow spaces with a setting material.

The tool system may also have several trimming bodies, of varying size and/or of different materials, having different relative permittivity.

The tool system may also have a connection plate, for mounting between a capacitor plate and a mold half of the tool or on a side of a capacitor plate facing away from a mold half of the tool, and which has media connections and/or media channels and/or media openings for the supply and or discharge of media for the hollow spaces of the mold half, from or to the outside. The connection plate may have pipe sections which, when the connection plate is installed according to specification, extend into the hollow spaces of the mold half. The connection plate may be used to introduce media, in particular trimming fluid, into the hollow spaces. Depending on the design, the introduction of media may be effected jointly into all hollow spaces or individually in specific hollow spaces or groups of hollow spaces.

According to a further aspect of the present invention, a method is provided for the production of at least one particle foam parts by the welding of foam particles using electromagnetic waves. This involves a tool with mold halves forming a mold cavity arranged between two capacitor plates. The mold cavity is filled with foam particles, the tool is closed by bringing the two mold halves together, and the tool with the foam particles is subjected to electromagnetic waves, in particular radio waves or microwaves, introduced into the mold cavity via the capacitor plates, wherein the foam particles are heated by the electromagnetic waves and at least partially fuse or bake together, wherein the method is implemented using the tool or tool system described above.

At the same time, at least one trimming bodies or a trimming fluid may be provided in the hollow space or at least one of the hollow spaces, in order to influence an electromagnetic field in the mold cavity.

It may also be provided, depending on the quality of the welding of the foam particles, for the arrangement of the at least one trimming bodies or the trimming fluid in the tool to be changed, in order to adjust the influencing of the electromagnetic field in the mold cavity.

It may also be provided for the arrangement of at least one trimming bodies or the trimming fluid in the tool to be varied during a foaming process, in order to have dynamic influence on an electromagnetic field in the mold cavity. By this means it is possible to react, in particular, to changing permittivity of the molding during the foaming process.

If for example it is determined that a particle foam part is incompletely welded in a certain area, the trimming body may be inserted adjacent to this area, by which means the electrical field in the mold cavity in which this area is produced, is intensified. If on the other hand the particle foam part is fused too much at one point, then trimming bodies may be inserted in the trimming wall mold half, in the other areas adjacent to this point, and the heat output altogether reduced by means of the electrical field either being applied for a shorter period of time, and/or the electrical field strength (or the electrical voltage in the case of an RF field applied by means of capacitor plates) being reduced.

In conjunction with the setting of the whole electrical power or heat output, this method may be used to correct both areas with too much heating and areas with too little heating.

As already mentioned, a particular field of application of the present invention where the above-described tool, tool system, and method may be used particularly desirablely, is the manufacture of shoes soles, in particular insoles and/or midsoles. Such soles may be used, for example, in sports shoes, in particular, in running shoes.

A further aspect of the present invention is therefore provided by a method for the manufacture of a shoe sole by the welding of foam particles using electromagnetic waves, wherein a tool with two mold halves forming a mold cavity corresponding to the shape of the shoe sole is arranged between two capacitor plates. The mold cavity is filled with the foam particles and the tool is closed by bringing the two mold halves together. The closed tool with the foam particles in the mold cavity is then subjected to electromagnetic waves, in particular, radio waves or microwaves, introduced into the mold cavity via the capacitor plates and the foam particles are heated by the electromagnetic waves and, at least partially, fuse or bake together. At least one of the two mold halves is made of a material which is transparent to electromagnetic waves, has a boundary wall which bounds the mold cavity, and has at least one support which serves to support the boundary wall on the capacitor plate on the side facing away from the mold cavity and which form at least one hollow spaces.

Since shoe soles typically have a complicated geometry, including regions with different thicknesses, curvature, contouring, etc., the local control of the amount of energy provided to the foam particles during manufacture is of particular importance to ensure an even and consistent connection between the foam particles, and hence a high-quality product. The above-described method allows such a localized control and hence improves the methods known from the prior art at least in this regard. In addition, it may also shorten the cycle times necessary for the manufacture of an individual sole and may generally simplify manufacture, for example, since no steam generator or supply system is necessary.

It is pointed out that in the present context the meaning of the statement that the mold cavity corresponds to the shape of the shoe sole is that the mold cavity generally defines the shape of the manufactured sole in that the contouring, outline, different thicknesses and further such features of the shoe sole are already 'pre-set' by the shape of the mold cavity. However, the manufactured shoe sole or soles may still undergo further 'fine-tuning' steps after they are taken from the mold, and they may also undergo some amount of shrinkage or expansion after they are taken from the mold, for example, during a cooling or curing process.

Further aspects and optional features of the above-mentioned method for the manufacture of a shoe sole by the welding of foam particles using electromagnetic waves are described in the following, to facilitate the understanding of the scope and possibilities of the disclosed method. However, this discussion is not exhaustive, and the skilled person will understand that aspects, features and options described in the more general context of the manufacture of general "foam parts" in other places of the present application may also be applied to the method for the manufacture of a shoe sole discussed at present, even if this is not explicitly mentioned. Not all such possible features and options will therefore be discussed in the specific context of the manufacture of a shoe sole again, for conciseness and to avoid unnecessary redundancies. Reference is instead made to the corresponding explanations at other places in this application, which are also applicable in the context of the manufacture of shoe soles, as far as physically and technically feasible.

For example, at least one trimming bodies or a trimming fluid may be provided in the hollow space, or at least one of the hollow spaces, of the mold half, or halves, used for the manufacture of the shoe sole in order to influence an electromagnetic field in the mold cavity, in particular, the electromagnetic field used to fuse or bake the particles together.

Depending on the quality of the welding of the foam particles, the arrangement of the at least one trimming bodies or the trimming fluid in the tool may be changed in order to adjust the influencing of the electromagnetic field in the mold cavity. The arrangement of the at least one trimming bodies or the trimming fluid in the tool can alternatively, or additionally, also be varied during the exposure of the particles to the electromagnetic waves to fuse or bake them together in order to have a dynamic influence on the electromagnetic field in the mold cavity and, hence, on the nature and degree of the fusion or baking.

The boundary wall of the mold half or halves may be made with substantially constant thickness. The at least one support can run roughly parallel to a pressing direction, in which the two mold halves in operation are pressed together by a press.

The tool used in the method for the manufacture of a shoe sole can also have connections for a tempering medium which flows through the one or the several hollow spaces.

The hollow space, or at least one of the several hollow spaces, of the tool can further have an opening through which the at least one trimming bodies are inserted. The opening, in some embodiments, faces the side facing away from the mold cavity. Moreover, the hollow space or at least one of the several hollow spaces can have a mold- or latching element for positioning and/or fixing the at least one trimming bodies in the hollow space.

One, or both, of the mold halves used for the manufacture of a shoe sole can furthermore have at least one connection for the trimming fluid which is connected to at least one of the one or several hollow spaces, wherein, in some embodiments, several hollow spaces are connected for fluidic communication with one another, or at least part-volumes of several hollow spaces are separated from one another with fluid-tightness.

One, or both, of the mold halves used for the manufacture of a shoe sole can also have at least one connection for compressed air and/or vacuum which is connected to at least one of the one or several hollow spaces, wherein, in some embodiments, the connection or connections for compressed air and/or vacuum is or are arranged on a higher plane than the connection or connections for the trimming fluid.

Alternatively, or in addition, the hollow spaces may be connected through connection openings in the supports, wherein the connection openings or a group of connection openings are, in some embodiments, flush with at least one of the connections made in a side wall for the tempering medium, the trimming fluid, the compressed air or the vacuum.

It is in particular possible that both mold halves are made of a material transparent to electromagnetic waves and have the boundary wall and the support(s).

Also, in the context of the manufacture of a shoe sole, the at least one trimming bodies may be made of a material with a relative permittivity ($\varepsilon$r) of at least 2. They may be made from a solid body or be produced by pouring a setting material into at least one of the hollow spaces. They can also be designed as a plug-in body for plugging into the hollow space or at least one of the hollow spaces. The trimming body, or bodies, can further have a shaped element or a latching element for positioning and/or fixing in the hollow space, or at least one of the hollow spaces or may be fixed by frictional locking in the hollow space or at least one of the hollow spaces. The trimming body, or bodies, may also be so designed that they fill only a partial area of the hollow space or one of the hollow spaces, wherein the partial area is, in some embodiments, a partial area located away from the mold cavity.

The foam particles may comprise at least one of the following materials: expanded thermoplastic polyurethane (eTPU), expanded polyamide (ePA), expanded polyether-block-amide (ePEBA); expanded polylactide (ePLA);

expanded polyethylene terephthalate (ePET); expanded polybutylene terephthalate (ePBT); expanded thermoplastic polyester ether elastomer (eTPEE).

For example, for use in the manufacture of shoe soles, foam particles of eTPU, ePEBA and/or ePA have turned out desirable and may hence be used in the context of the present invention. These materials may be particularly suitable for use in shoe soles, for example due to their high energy return and temperature independence.

As mentioned, the sole manufactured by the discussed method may be an insole or a midsole, and such a sole may be used and/or incorporated in a shoe, in particular a sports shoe like a running shoe.

Coming back to a more general discussion of the present invention not necessarily related to the manufacture of shoe soles, in trimming, the trimming bodies may also be machined, in order to change their shape to match the electrical field.

In principle it is also possible to generate locally adapted fields by means of capacitor plates which are divided, and height-adjustable in the individual parts. By means of the present invention it is possible, in a mold cavity of a tool for the production of a particle foam part, to make a local adaptation of the electromagnetic field even for flat-surfaced capacitor plates, which is considerably simpler in production and handling.

To summarise, in the tool described above, the shaping tool half is so designed that the resulting relative permittivity of the tool coincides well with the relative permittivity of the particle foam. This is achieved by providing the tool half with free surfaces or volumes (at least one hollow spaces) either side of the boundary wall and supports such as for example walls or bars, where applicable also ribs, posts, honeycombs, zigzag labyrinths, etc. The relation of a volume of supporting material and air determines the desired relative permittivity and may for example amount to at least 0.05 or 0.1 and/or up to 0.3 or 0.5 or 0.7 or 0.9. If the electromagnetic field is to be intensified locally, for subsequent optimisation of the tool, then trimming bodies may be inserted in the hollow spaces. If the supports are in the form of a labyrinth, then they may already and without further expense be used as cooling or heating channels. This makes possible variable tempering with air or $CO_2$ or another tempering medium. The tool according to the invention facilitates design without simulation, and design rules are simply defined.

DETAILED DESCRIPTION

A first embodiment of a tool 1 according to the invention for the production of a particle foam part has two mold halves 2, 3 (FIG. 1). A first mold half 2 (bottom in the Figure) is made of a base 7 and an all-round side wall 8. Provided on the outside of the base 7 is a first capacitor plate 4. The other, namely a second mold half 3 (top in the Figure) is made with a boundary wall 10 and an all-round side wall 11 and is in the form of a kind of punch, which may be introduced with minimal play into the area bounded by the all-round side wall 8, so that a mold cavity 13 is bounded between the two mold halves 2, 3, wherein the side wall 11 of the second mold half 3 faces away from the mold cavity 13. The second mold half 3 is therefore described as the punch mold half 3, and the first mold half 2 as the die mold half 2.

The first and second mold halves 2 and 3 may, in particular, cooperate to form a mold cavity 13 for the manufacture of a shoe sole, i.e. the shape of the mold cavity

13 may, in particular, correspond to the shape of a shoe sole. With regard to the question of what "correspond" means in this context, for conciseness, we refer to the above explanations in this regard.

All of the features, options and possibilities described below in more detail therefore explicitly apply to the specific case of the manufacture of a shoe sole, even if this is not mentioned every time.

It is pointed out, however, that for the manufacture of a shoe sole, the use of foam particles made of or comprising eTPU, ePEBA and/or ePA is particularly desirable, because these materials can provide properties, like for example good energy return and a high degree of temperature independence in their behaviour, that are beneficial for their use in shoe soles.

Other materials the foam particles may comprise or be comprised of are: expanded polylactide (ePLA); expanded polyethylene terephthalate (ePET); expanded polybutylene terephthalate (ePBT); expanded thermoplastic polyester ether elastomer (eTPEE); or combinations thereof.

Coming back to a more general discussion of the present invention, not necessarily related to the manufacture of shoe soles, on the same side as the side wall 11, several bars 12 protrude from the boundary wall 10. The bars 12 are joined to the side wall 11 and end on a plane on which lies a second capacitor plate 5. The bars 12 and the side wall 11 of the punch mold half 3 are therefore supports for the purposes of the invention, serving to support the boundary wall 10 on the second capacitor plate 5. The second capacitor plate 5 has a wave-guide connection 6 for the connection of a waveguide. The side walls 11 and bars 12 of the punch mold half 3 form with one another and with the boundary wall 10 in each case hollow spaces 15, each having an opening 14 at the top. It is therefore to be noted that the hollow spaces 15 face away from the mold cavity 13. The second capacitor plate 5 is or may be connected to a piston rod of a press, in order to move the punch mold half 3 relative to the die mold half 2, and in particular to insert the punch mold half 3 in the die mold half 2 (direction of a framed arrow in FIG. 1).

On the side wall 8 of the die mold half 2 is a filler hole 9 for feeding foam particles into the mold cavity 13 (FIG. 1). A vent hole (not shown) may also be provided on the side wall 8, through which air can escape during filling of the mold cavity 13.

The tool 1 is provided for the production of particle foam parts by welding of foam particles fed into the mold cavity 13 using electromagnetic waves. For this purpose the first capacitor plate 4 may be connected to ground or earth and the second capacitor plate 5 may be connected via the waveguide connection 6 to a wave generator. On connection of a wave generator such as an RF or microwave generator, a high-frequency electromagnetic field is generated in the mold cavity 13. Through the energy of the electromagnetic field, the foam particles are fused and welded together.

The strength of the electromagnetic field prevailing in the mold cavity 13 depends on the properties of the materials present between the capacitor plates 4, 5, and in particular on their relative permittivity $\varepsilon r$. The relative permittivity $\varepsilon r$ is defined as the ratio between the permittivity of a material or medium and the permittivity of the vacuum, the electromagnetic field constant $\varepsilon 0$. The relative permittivity $\varepsilon r$ is material-dependent and may be understood as a measure of the field weakening effects of a dielectric polarisation of the material. The greater the relative permittivity $\varepsilon r$ of a material, the greater the field weakening.

For air for example the relative permittivity $\varepsilon r$ lies close to the electrical field constant $\varepsilon 0$, precisely at $\varepsilon r=1.00059$.

Further examples of relative permittivity are: for Teflon, $\varepsilon r = 2$; for paraffin, $\varepsilon r = 2.2$; for kiln-dried wood, $\varepsilon r = 2 \ldots 3.5$; for PE and PET, $\varepsilon r = 3.5$; for PEEK, $\varepsilon r = 4$; for ABS, $\varepsilon r = 4.3$; for porcelain, $\varepsilon r = 2 \ldots 6$; for glass, $\varepsilon r = 6 \ldots 8$; for tantal pentoxide, $\varepsilon r = 27$; for barium titanate, $\varepsilon r = 15000$ (from Helmut Benkert, Einfurhung in die Technische Keramik [Introduction to Technical Ceramics], http://www.keramver-band.de/keramik/pdf/02/sem02_03.pdf) (in each case at roughly 18° C. and 50 Hz, after https://de.wikipedia.org/wiki/Permittivitdt, unless otherwise stated). The above examples are intended only as an overview, and in no way restrict the possible choice of materials for elements specified in this application, such as for example the mold halves 2, 3 or the trimming bodies 30, 50 described later.

The mold halves 2, 3 are transparent to (i.e. in principle permeable by) electromagnetic waves, in particular those with a wavelength of the waves generated by the wave generator. I.e. at least the base 7 of the die mold half 2 and the boundary wall 10 of the punch mold half 3 are made from a dielectric which has for example plastic, wood, ceramics, glass or the like. The foam particles fed into the mold cavity 13 likewise have dielectric properties. Not only due to irregular geometry of the mold cavity 13, but also with locally differing charging means in the foam particles together with influences from the mold halves 2, 3 themselves, it is possible for locally different field strengths of the electromagnetic field to prevail in the mold cavity 13 and in the particle foam part to be created, and/or for the energy of the electromagnetic field to be absorbed with locally varying strength by the foam particles in the mold cavity 13. Such irregular field strengths and/or absorption rates may be desired, for example because the fusing properties of different foam materials may vary, but it may also be undesired. This may lead to insufficient or excessive heating and thus to undesired results in foam particle fusing. To remedy this problem, the hollow spaces 15 of the punch mold half 3 are provided, which considerably reduce the mass of material in the punch mold half 3. This in turn leads to an desirable reduction in the influence on the electromagnetic field strength in the mold cavity 13, which considerably enhances flexibility in use and in shaping of the mold cavity 13, also of the punch mold half 3. These and other advantages have already been described at the start of this application, so that they are only referred to at this point.

The hollow spaces 15 may also be used for trimming the punch mold half 3, in order to influence the electromagnetic field in the mold cavity 13. By suitable trimming, the electromagnetic field in the mold cavity 13 may be so influenced that an even or otherwise desirable field strength prevails in the mold cavity 13. For example, it may be desirable to have locally differing field strengths in the case of locally differing particle materials with different relative permittivity, for locally varying material strengths and locally different material densities. For example, it has been found that, at points of low material strength (i.e. a low height of the mold cavity 13), higher material densities occur due to closing of the tool. Since compacted foam particles absorb the applied electromagnetic field more strongly, such points may be subject to more intensive heating than adjacent points. It may therefore be observed that, at points of greater compaction, the foam particles are too strongly fused or even burned or charred, and/or that welding of the foam particles is inadequate at adjacent points. It may therefore be desirable to have lower field strength at the points of greater compaction of the foam particles than at adjacent points. The same applies to material mixes with sections of more strongly absorbing foam particles and sections of less strongly absorbing foam particles. It may also occur that the tool and the foam selection have been matched to one another in advance with the aid of models or tests, but later in series production, variances in fusing behaviour occur, for example through the use of a modified formulation, or even just another batch of foam particles. In all these cases it may be desirable to influence the electromagnetic field in the mold cavity 13.

Figure 3:
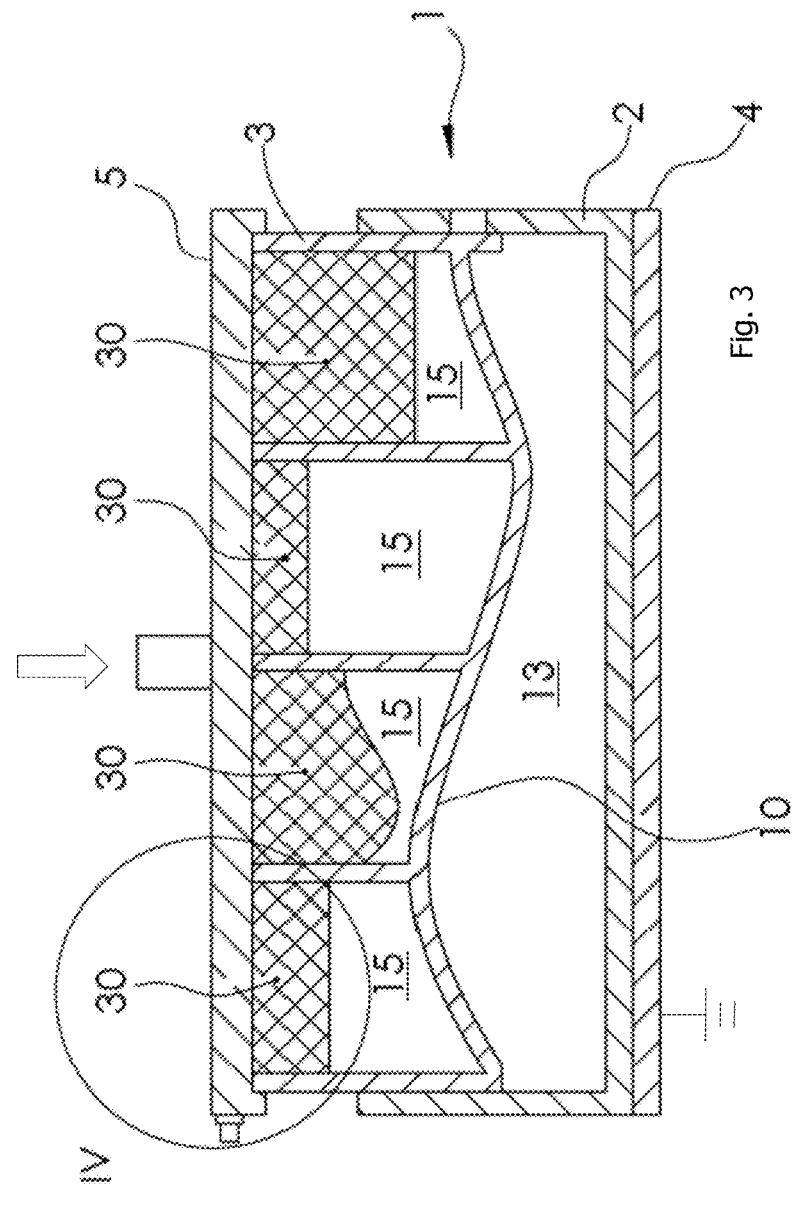
FIG. 3: embodiments of a tool system with the tool of FIG. 1 and trimming bodies.

For this purpose, trimming bodies 30 may be inserted into the hollow spaces 15 through the openings 14 (FIG. 3). The trimming bodies 30 are made of a dielectric material. Due to the polarising properties of a dielectric, the electromagnetic alternating field is weakened by the dielectric lying in the path of the field lines. In areas on the path of these same field lines, which are kept free from the dielectric, the field is on the other hand not weakened, but is even intensified. The electrical field may this be influenced in different ways by means of trimming bodies 30 of varying size, shape and permittivity.

Figure 4A:
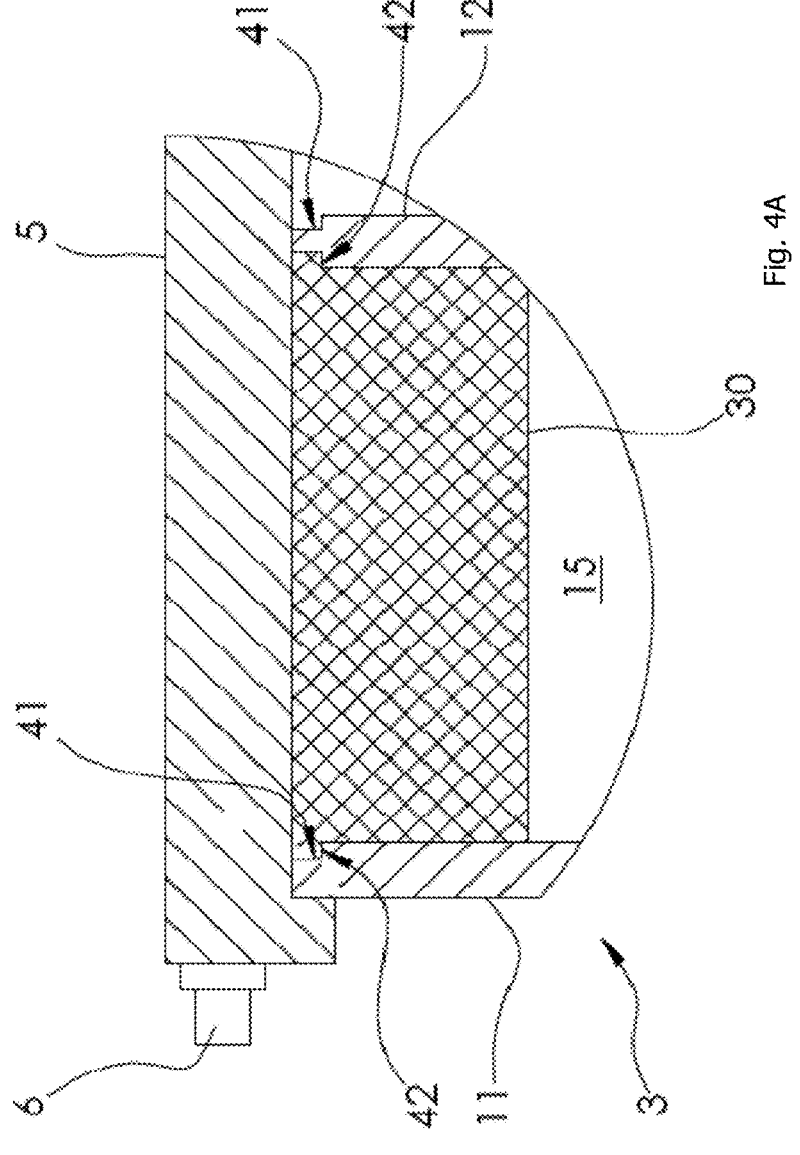
FIGS. 4A-4B: embodiments of a mold half with trimming bodies in an enlarged view of a detail IV of FIG. 3.
Figure 4B:
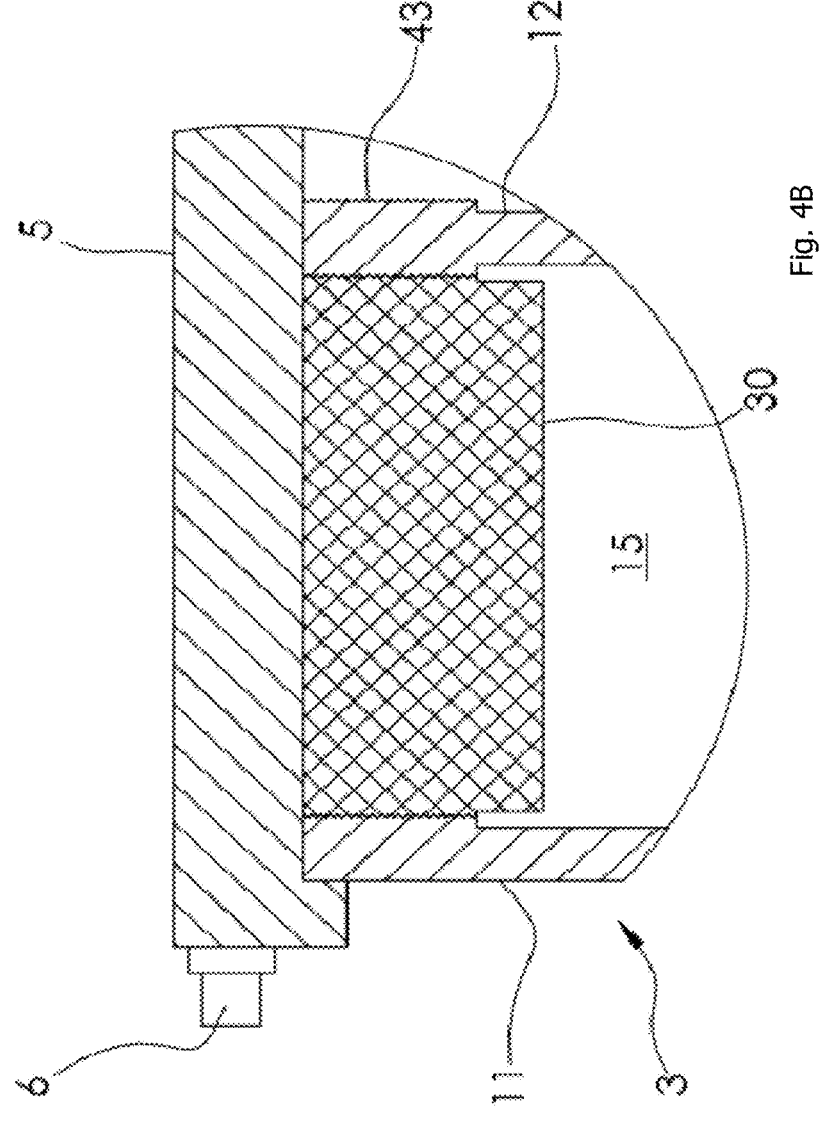

In order to fix the position of the trimming bodies 30 in the hollow spaces 15, the side walls 8 and bars 12 of the punch mold half 3 may have steps 41 in the area of the openings 14, and the trimming bodies 30 may have rims 42 or similar shaped features on top, which rest on the steps 41 on insertion of the trimming bodies 30 (FIG. 4A). Alternatively, the side walls 8 and bars 12 of the punch mold half 3 may have latching elements 43 in the area of the openings 14 or throughout or in other areas, and the trimming bodies 30 may have on the side corresponding shape features which engage with the latching elements 43 on insertion of the trimming bodies 30 (FIG. 4B). Alternatively, the trimming bodies 30 may be so designed that they are held in the hollow spaces 15 by simple friction.

Figure 5:
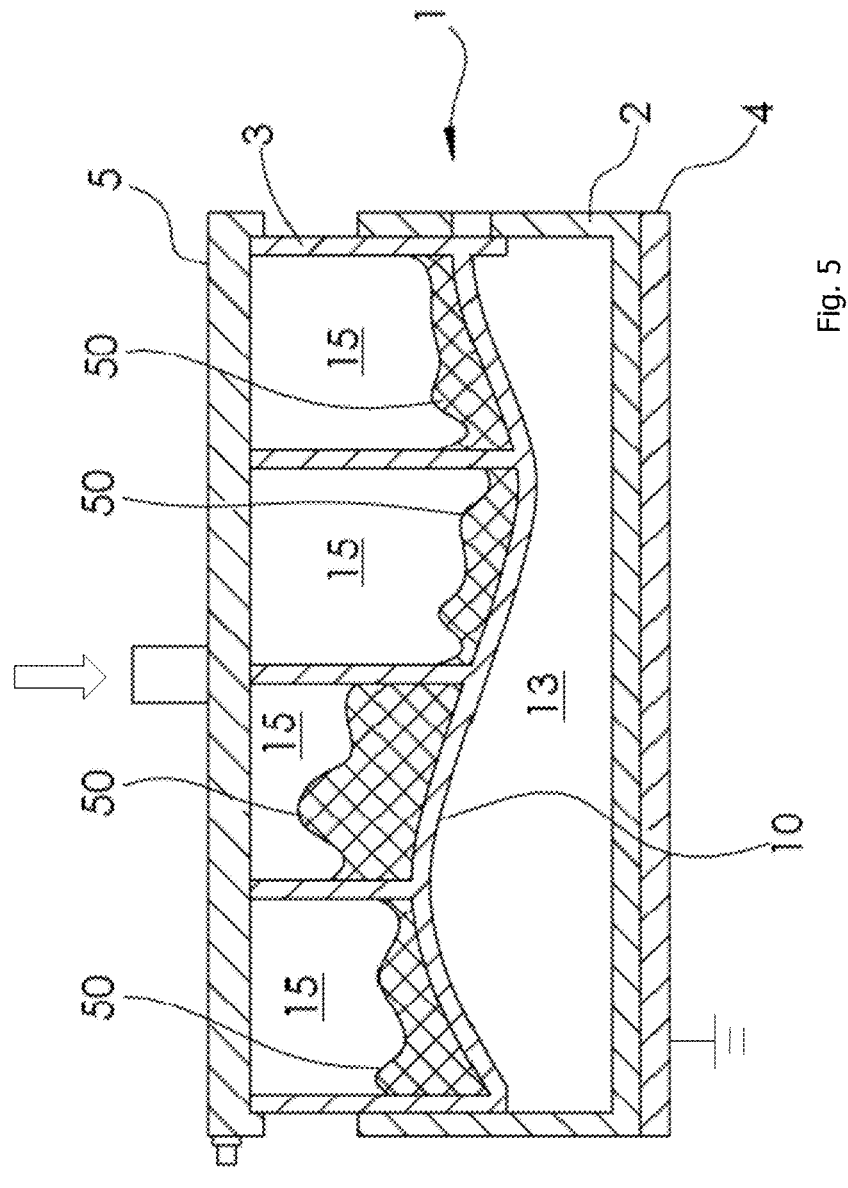
FIG. 5: embodiments of a tool system with the tool of FIG. 1 and different trimming bodies.

Instead of trimming bodies 30 preformed as plug-in bodies as described above, trimming bodies 50 may also be formed by introducing a moldable dielectric material into the hollow spaces 15 (FIG. 5). In this case, the trimming bodies 50 may be attached especially easily to the inside of the boundary wall 10. After insertion, the dielectric material of the trimming bodies 50 may be hardened or adhere with great toughness to the material of the second mold half 3.

The trimming bodies 30, 50 are, in some embodiments, made from a material with a relative permittivity ($\varepsilon r$) of at least 2. The greater the relative permittivity ($\varepsilon r$) of the material of the trimming bodies 30, 50, the greater is their effect on the trimming of the mold half 3, in order to influence an electromagnetic field in the mold cavity 13. Consequently, even materials with a relative permittivity ($\varepsilon r$) of at least 3 or at least 4 may be expedient. The lower the relative permittivity ($\varepsilon r$) of the material of the trimming body, the more precisely and finely the electrical field in the mold cavity may be set. Materials with a low relative permittivity ($\varepsilon r$), for example less than 2, may therefore also be sensible.

In some embodiments, depending on requirements, that not all hollow spaces 15 are filled with a trimming body 30, 50. In some embodiments, the second mold half 3, on the basis of preliminary tests or simulations, is prepared with primary trimming bodies 30, 50 and subsequently, with the aid of actual, possibly changing circumstances in series production, as shown by the foaming results, is fine-trimmed with secondary trimming bodies 30, 50. Here the primary trimming bodies may be in the form of trimming bodies 50 of a moldable compound (FIG. 5), while the secondary trimming bodies are made as trimming bodies 30 with a fixed geometry (FIG. 3), or vice-versa, or in each case one of both. In some embodiments, a primary trimming body 30 of fixed geometry has a further hollow space, in which a secondary trimming body 30, 50 of fixed geometry or of moldable material may be inserted.

Figure 6:
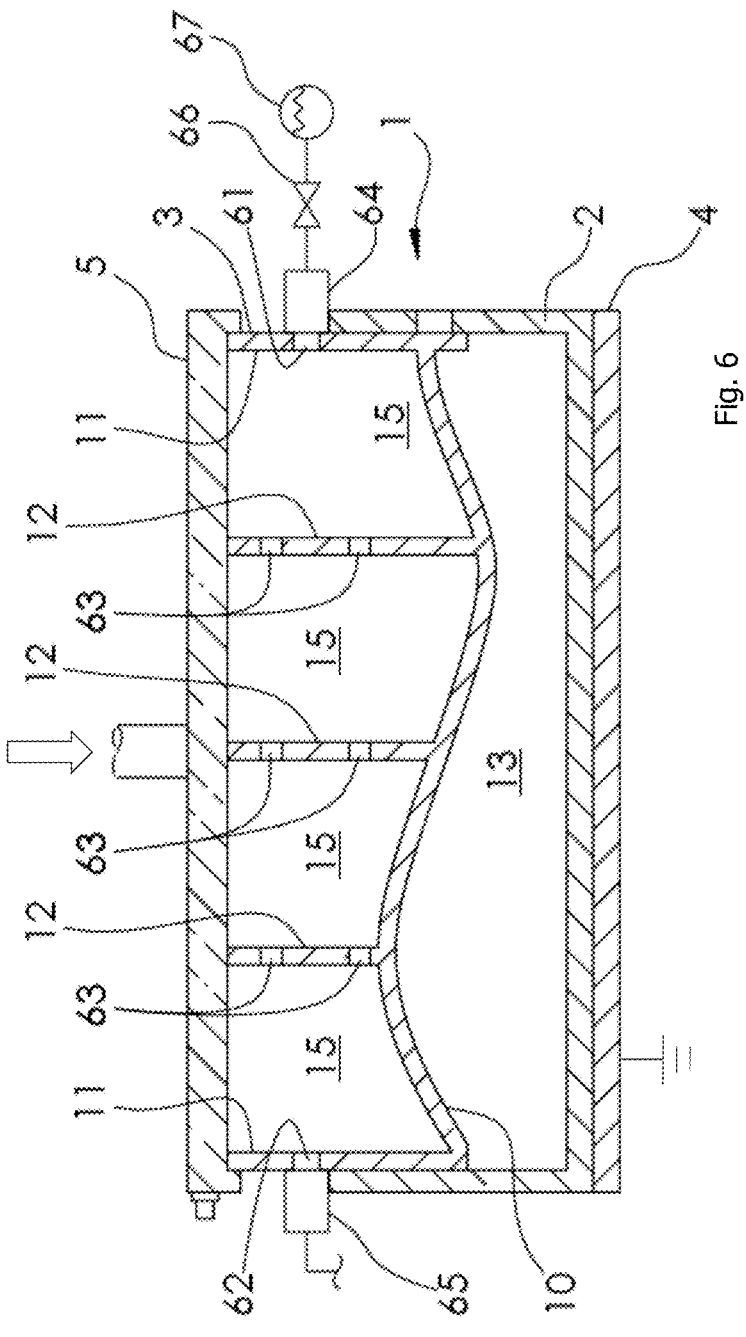
FIG. 6: embodiments of a tool with two mold halves in a view according to FIG. 1.

In the embodiments described and illustrated, the hollow spaces 15 are filled only in part with a trimming body 30, 50. As a result it is possible to use the remaining space for tempering with a tempering medium. In a further embodiment, the side wall 11 of the punch mold half 3 may have a fluid inflow orifice 61 and a fluid outlet orifice 62 and the bars 12 may have fluid throughflow orifices 63 (FIG. 6). Provided at the fluid inflow orifice 61 is a fluid flow connection 64 which is connected via a valve 66 with a fluid source 67. Provided at the fluid outlet orifice 62 is a fluid return connection 65 which—depending on the fluid used and on process control—leads into the open air, the environment or, where applicable, via a treatment unit, back to the fluid source 67. Consequently, a tempering fluid may be fed through the hollow spaces 15 of the punch mold half 3, in order for example to preheat the tool 1, to cool the mold cavity 13 or particle foam bodies contained therein, or quite generally to effect a desired temperature control.

Depending on the nature and arrangement of the trimming bodies 30, 50 used (cf. FIGS. 3, 5), the fluid throughflow orifices 63 may be located in the upper area of the hollow spaces 15 or in the lower area of the hollow spaces 15, so that throughflow of the tempering fluid is not impeded by the trimming bodies 30, 50. If the fluid throughflow orifices 63, as in the depicted embodiment, are located in both the upper area and the lower area of the hollow spaces 15, then different types of trimming bodies 30, 50 may be used alternatively. The fluid inflow and outflow orifices 61, 62 are, in some embodiments, at the height of the fluid throughflow orifices 63 or, if the fluid throughflow orifices 63 are located in both the upper area and also the lower area of the hollow spaces 15, at a height lying between the heights of the fluid throughflow orifices 63. If a trimming body 30 of fixed geometry is so large that it extends into the area of the fluid throughflow orifices 63, then transverse bores may be provided in such a trimming body 30 at the height of the fluid throughflow orifices 63. If it should be possible to fill a trimming body 50 of a moldable material above the height of the fluid throughflow orifices 63 into the hollow space, then it may be desirable for the fluid inflow and outflow orifices 61, 62 and the fluid throughflow orifices 63 to be connected by small pipes or the like. Even if the fluid inflow and outflow orifices 61, 62 in the depicted embodiment are provided on opposite sides of the punch mold half 3 and depending on fluid conduction within the punch mold half 3, they may be arranged on the same side or on adjacent sides. To avoid the tempering fluid escaping from the opening 14 of the hollow spaces 15, a seal may be provided on the contact surface of the second capacitor plate 5, wherein the seal may be designed as a boundary seal on the side of the second mold half 3 or as a flat seal on the side of the second capacitor plate 5. Where applicable, the material pairing between the second mold half 3 and the second capacitor plate 5 in operation (i.e. under pressure) may also have an adequate sealing effect.

In some embodiments, each of the mold halves 2, 3 is made of a single molding. Alternatively, the side wall 8 of the first mold half 2 may be attached to the base 7. As a further alternative, the base 7 of the first mold half 2 may be omitted if an adequate seal between the side wall 8 and the first capacitor plate 4 is ensured in operation (i.e. under pressure). This may be effected by a separately provided seal or by the material pairing between the first mold half 2 and the first capacitor plate 4.

According to the embodiment described above, the capacitor plates 4, 5 are not part of the tool 1. In a variant embodiment, one or both of the capacitor plates 4, 5 may be part of the tool 1. For example, the base 7 of the die mold half 2 may have the first capacitor plate 4, or the first capacitor plate 4 may form the base 7 of the die mold half 2. The first capacitor plate 4 may for example be attached to the side wall 8 of the die mold half 2 (for example screwed, glued, cast on, etc.) or integrated in the base 7 of the die mold half 2 (for example cast-in, inserted in a pocket, etc.).

Even if the openings 14 leading into the hollow spaces 15 are provided on the upper edge of the punch mold half 3 in the depicted embodiments, the invention is not restricted to this configuration. Instead, in embodiment variants, the openings 14 may also be provided in a side wall 11 of the punch mold half 3, while the top of the punch mold half 3 is closed. In order to reach, from one side, areas of the punch mold half 3 lying further inwards, openings 14 may also be provided in the bars 12. In such an embodiment variant, the second capacitor plate 5 may be joined to the punch mold half 3 or combine with it to form a component. For example, the second capacitor plate 5 may be attached to the side wall 11 of the punch mold half 3 (for example screwed, glued, cast on, etc.) or integrated in a top panel (where present) of the punch mold half 3 (for example cast-in, inserted in a pocket, etc.).

In further embodiment, the side walls 8, 11 of the mold halves 2, 3 are made of an electrically conductive material, and that they are conductively connected to or made integral with the capacitor plates 4, 5. If the side walls 8, 11 of both mold halves 2, 3 are made electrically conductive, then they are coated, at least in the areas where they contact one another, with an electrically insulating layer, in particular a plastic coating. In some embodiments, in such embodiments, the all-round side wall 8 is not electrically conductive, e.g. being made of plastic so that, at the boundary zone, no very small spaces occur which would lead to locally very strong electrical fields.

Figure 2A:
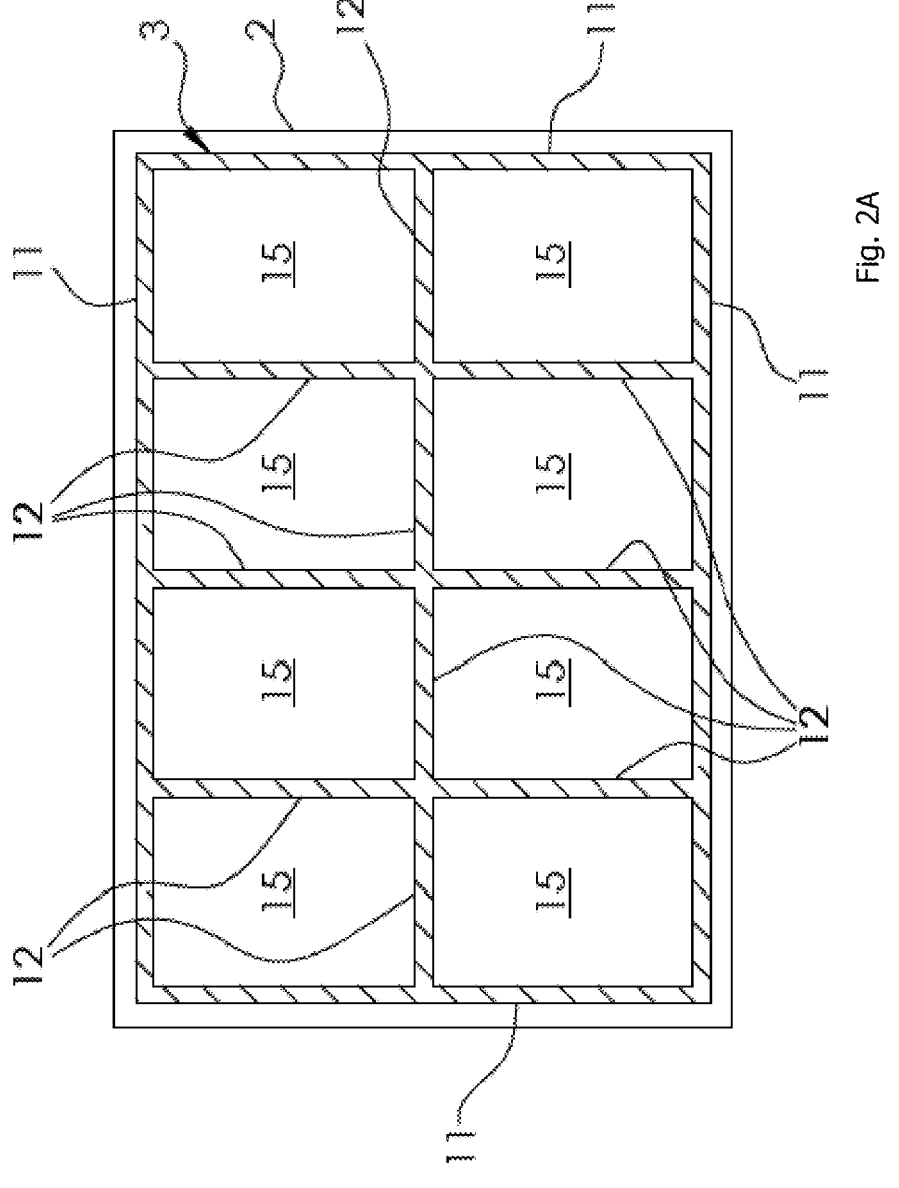
FIG. 2A: a sectional view from above, along a plane indicated by a line II=II in FIG. 1, of a top mold half of FIG. 1.
Figures 2B, 2C, 2D, 2E:
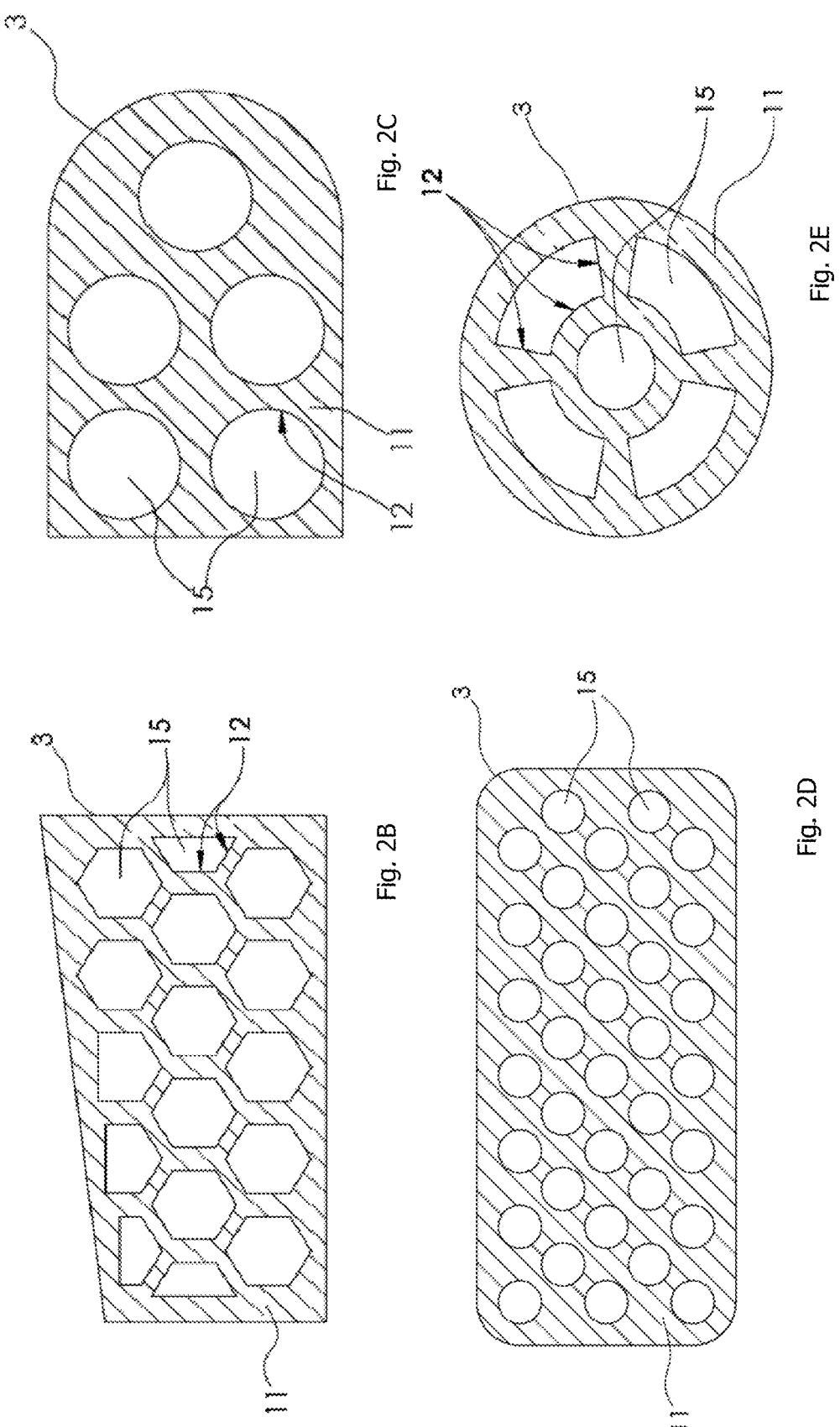
FIGS. 2B-2E: views of mold half modifications based on FIG. 2A.

It should be noted that the presentation of the geometry of the mold halves 2, 3, the mold cavity 13 and the hollow spaces 15 is purely an example and depends completely on the nature and shape of a particle foam body to be produced. If the mold cavity 13 and with it the punch mold half 3 in a top view are for example rectangular, the hollow spaces 15 may likewise be rectangular or square and arranged in the manner of a matrix of for example two rows of four hollow spaces 15 (FIG. 2A). As required, the hollow spaces 15 may be more or less close together, and the hollow spaces 15 may also have different cross-section shapes and sizes. For example, the hollow spaces may also be hexagonal (FIG. 2B) in cross-section or circular (FIG. 2C) or more tightly packed (FIG. 2D) or have a different shape. If the mold cavity 13 and with it the punch mold half 3 in a top view are for example circular or oval, then the hollow spaces 15 may for example be arranged like a piece of cake (FIG. 2E) or surrounding a circular hollow space 15 in ring-segment form (FIG. 2F). The cross-section shapes of the mold half 3 shown in the Figures are entirely exemplary. The mold half 3 may be integral with the hollow spaces 15 and produced in a single operation, for example by a casting process. Alternatively, the hollow spaces 15 may also be incorporated subsequently in the mold half 3, for example by drilling out of a complete block. Moreover, it is also possible to produce the mold halves 2, 3 by an additive production process such as three-dimensional printing, by which means complex shapes with great variety may be realised, with or without a minimum of reworking.

Even if, in the depicted embodiments, the hollow spaces 15 are provided in the punch mold half 3, the die mold half (first mold half) 2 may be provided with hollow spaces in a corresponding manner, in addition or as an alternative to the punch mold half 3.

In addition, in some depicted embodiments, the top capacitor plate 5 is provided with an all-round edge bar, which surrounds the side wall 11 of the punch mold half 3. This edge bar may help to centre and stabilise the side wall 11 but is entirely optional and may also be omitted.

Even when each of the side walls 8, 11 is described as a single continuous side wall, individual sections of the side walls 8, 11 adjacent to one another in the circumferential direction may also be referred to as side wall.

The tool 1 may be in the form of a crack gap tool, and used as such in operation in basically three different settings: an open setting (not shown) in which the two mold halves 2, 3 are completely separated from one another, so that a particle foam part produced with the molding tool may be demolded, an intermediate position (not shown) in which the punch mold half 3 is inserted so far into the die mold half 2 that the mold cavity 13 is closed, but the mold cavity 13 is not yet reduced to its final volume in the closed position (FIGS. 1, 3, 5, 6).

In the intermediate position, the filler hole 9 and any vent hole are not covered by the punch mold half 3, so that these through openings communicate with the mold cavity 13 and foam particles may be fed in and/or air discharged. In the intermediate position, the mold cavity 13 is filled with foam particles. The punch mold half 3 is then pressed a little further into the die mold half 2, so that the foam particles contained therein are compressed.

Figure 7:
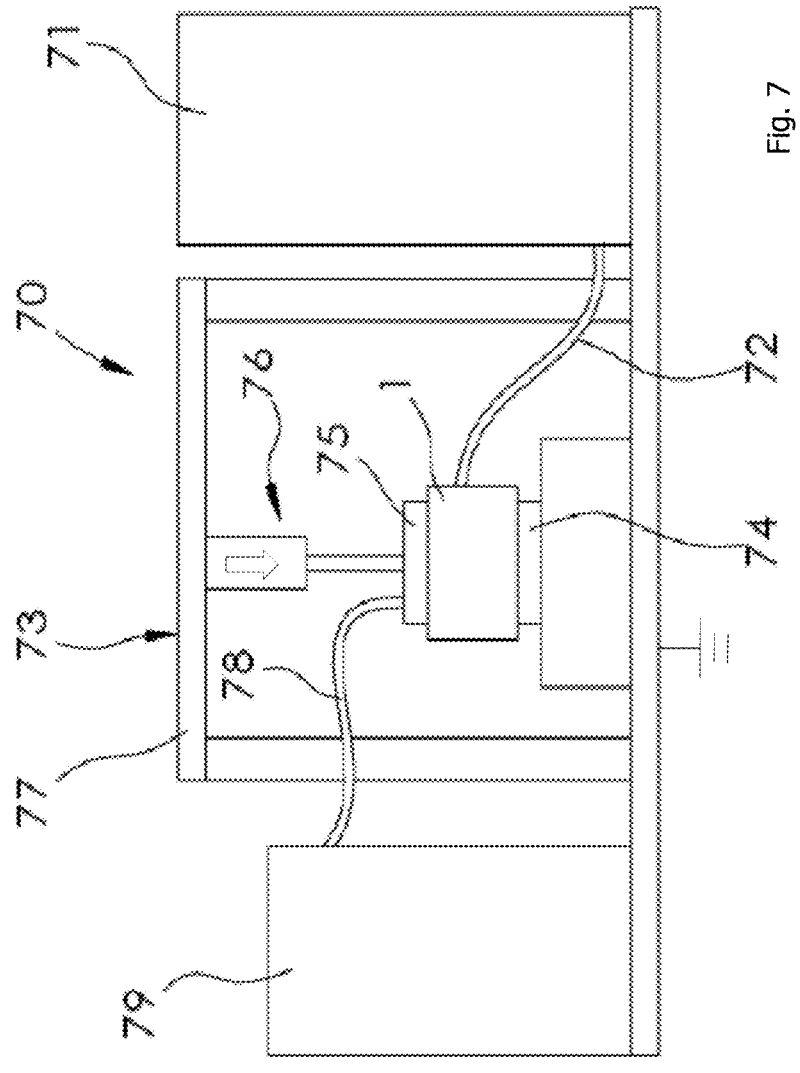
FIG. 7: embodiments of an apparatus for the production of particle foam part with a tool or tool system of one of the previous representations in a schematic side view.

The tool 1 may be used in an apparatus 70 for the production of particle foam parts (FIG. 7). Such an apparatus has a supply tank 71 which is connected to the tool 1 by the filler hose 72. The tool 1 is mounted in a press 73 which has a press table 74, a press punch 75, a cylinder-piston unit 76 for moving the press punch 75, and a stable frame 77, to which the cylinder-piston unit 76 and the press table 74 are fixed. The press punch 75 is made of an electrically conductive metal plate. Varying from the embodiments of FIG. 1, in which the second capacitor plate 5 has a waveguide connection 6, here the press punch 75 is connected via a waveguide 78, e.g. in the form of a coaxial cable, to a wave generator 79. The press table 74 has an electrically conductive table top made of metal, which is connected to earth via an electrically conductive baseplate.

The use of the tool 1 to produce a particle foam part in the apparatus 70 is described below.

The tool 1 is, to begin with, in an intermediate position. Here the punch mold half 3 is inserted so far into the die mold half 2 that the mold cavity 13 is substantially closed. In this intermediate position the tool 1 is inserted in the press 73. The filler hose 72 is connected to the filler hole 9 of the tool 1.

Foam particles from the supply tank 71 are fed to the mold cavity 13. When the mold cavity 13 is completely filled with foam particles, then the cylinder-piston unit 76 is actuated, in order to press together the two clamping platens 13, 16 and with them the two mold halves 2, 3. The tool 1 is thus brought into the closed position. By this means the foam particles present in the mold cavity 13 are compressed.

On pressing together of the two mold halves 2, 3, the filler hole 9 of the die mold half 2 is covered by the punch mold half 3 and thereby closed. The filler hose 72 may then be removed from the tool 1. A plug may then be inserted in the filler hole 9 and has a similar dielectric constant to the side wall 8.

In the pressed-together or closed state of the tool 1, the wave generator 79 is used to generate an electromagnetic high-frequency signal (RF or microwave signal) which is applied via the waveguide 78 to the press punch 75 at the top capacitor plate 5 of the punch mold half 3. The waveguide 78 may be hollow and may have a core. The bottom capacitor plate 4 of the die mold half 2 is connected to earth via the press table 74. The capacitor plates 4, 5 are insulated from one another electrically by the electrically non-conductive base body of the mold halves 2, 3, so that they form a plate capacitor, which encompasses the mold cavity 13. By means of the electromagnetic field thus generated, the foam particles are heated and welded together into a particle foam part.

The press 73 may be opened so that the tool 1 may be removed. If the tool has locking devices, it may be removed in the closed state. It may then be cooled by means of a suitable cooling device, for example a fan. While the tool 1 in which a particle foam part has already been formed is cooled, a further tool 1 may be inserted in the press 73.

When the particle foam part has been sufficiently cooled, the two mold halves 2, 3 are if necessary loosened, the punch mold half 3 is lifted, and the particle foam part may be suitably demolded.

The capacitor plates 4, 5 are in these embodiments, part of the apparatus 70 and may be used for a variety of tools 1. They are also used in particular as press plates in the apparatus 70. In this connection it is also irrelevant whether the tool 1 is inserted between the capacitor plates 4, 5 in the orientation shown in FIG. 1, etc. from above and below or vice-versa.

Figure 12:
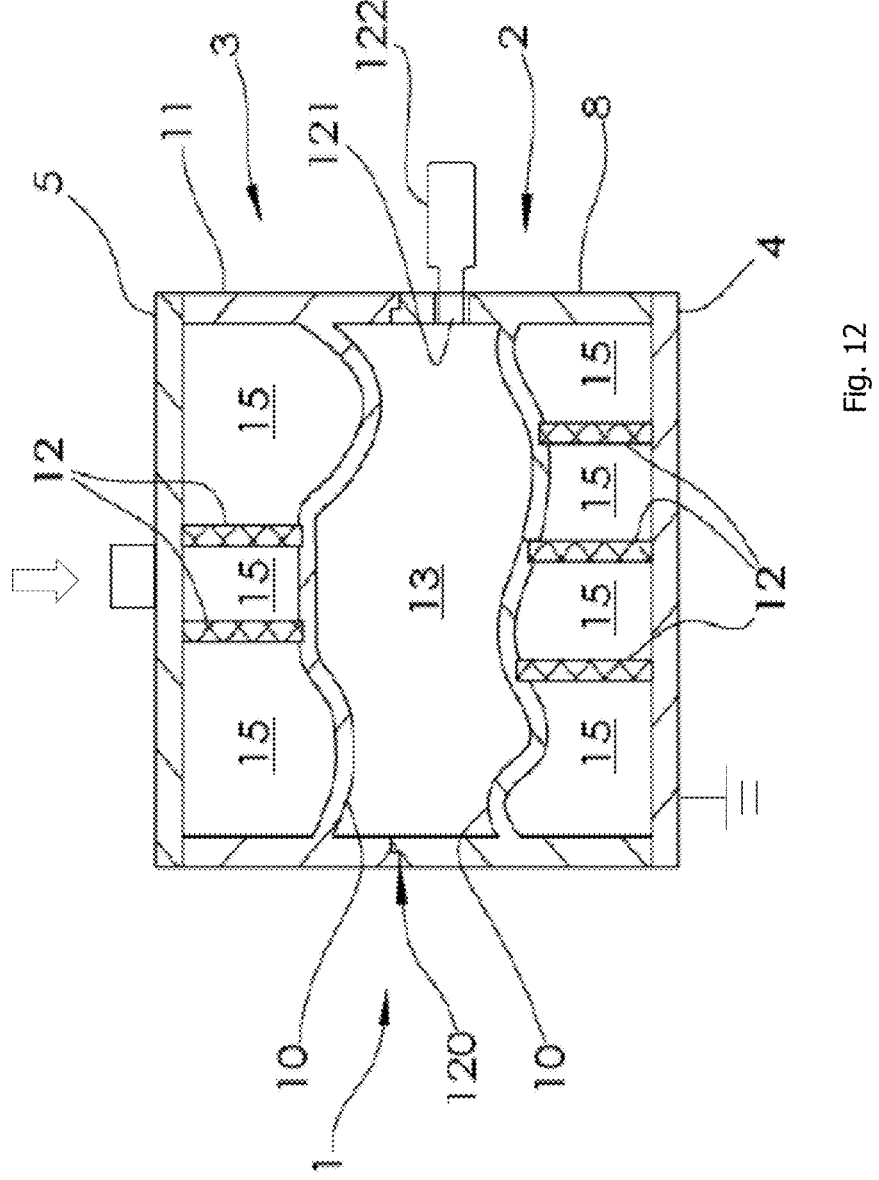
FIG. 12: a further sectional view of an embodiment of a tool with two mold halves, in a closed position.

The tool according to the invention may be modified in a variety of ways. In a tool 1 according to a further embodiment, both mold halves 2, 3 are made with hollow spaces 15 for trimming the respective mold halves, in order to influence an electromagnetic field within the mold cavity 13 (FIG. 12). In these embodiments, the first mold half 2 in this respect is basically analogous in form to the second mold half 3, so that the bars 12 and side wall 8 of the first mold half 2 form supports for the first capacitor plate 4.

Also, in these embodiments, the bars 12 are not integral with the mold halves 2, 3 as in previous embodiments, but are inserted as independent components in suitable slots in the side of the boundary walls 10 facing the mold cavity 13. Where applicable, corresponding slots, running vertically, may also be provided in the inner faces of the side walls 8, 11 of the mold halves 2, 3, in order to stabilise the bars 12. Alternatively or in addition, the bars 12 may also be bonded or welded on, or wedged between the side walls 8, 11.

The invention is also not restricted to the crack gap process. In the case of the tool 1 of this embodiment, the mold halves 2, 3 are not designed as punch and die, but instead abut one another at the ends with their side walls 8, 11. For this purpose the side walls 8, 11 have matching steps 120, in order to seal the mold cavity 13 as process pressure builds up. The tool 1 of these embodiments also has a filler hole 121 which, with the tool 1 closed, remains open and to which may be connected a filling injector 122, by which the foam particles are fed into the mold cavity 13.

Apart from the above modifications, what has been said previously for all other embodiments and their variants and modifications applies analogously, as far as basically applicable. Also, the above modifications, not only in their totality but also modifications taken individually of any other embodiments and its variants and modifications of other independent variants, as far as basically applicable.

Figure 8:
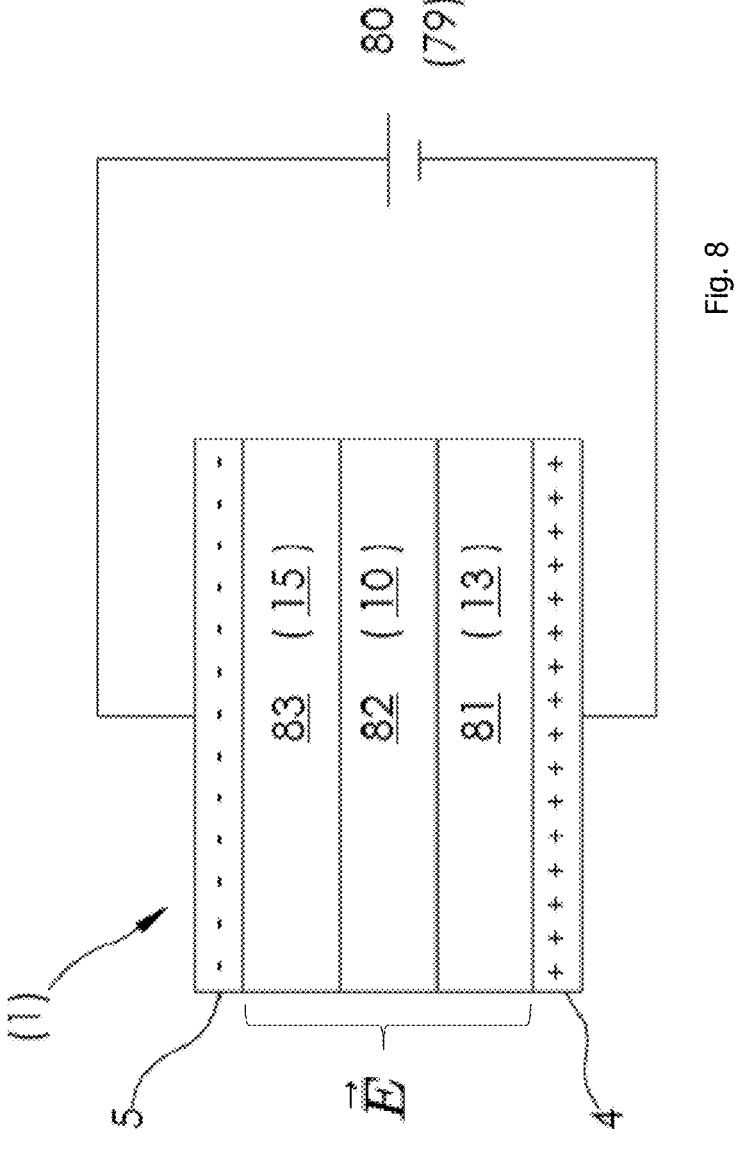
FIG. 8: an equivalent image of a tool with two mold halves, based on comparative simulations to determine a field pattern in the tool.

The inventors of the present application have made simulations of the effect of the present invention. To begin with, a simplified model as considered with the aid of an equivalent image (FIG. 8). This involved the capacitor plates 4, 5 being connected to a voltage source 80, corresponding to a polarisation state of the wave generator 79. Thus, the capacitor plates 4, 5 are oppositely charged. Between the capacitor plates 4, 5 are to be found several areas 81, 82, 83, each with different, where applicable also locally distributed, dielectric properties. For the simulation, at least three areas are required, of which a first area 81 corresponds to the mold cavity 13, a second area 82 corresponds to the boundary wall 10 and a third area 83 corresponds to a hollow space 15 of the tool 1. Under this specification, an electromagnetic field E forms between the capacitor plates 4, 5, with its strength depending on the relative permittivity of the areas 81, 82, 83. Using this model, field strength patterns of the electromagnetic field E between the capacitor plates 4, 5 may be calculated. Further areas may be defined as required or for further approximation to specific forms of the tool 1 and of a tool system with trimming bodies.

Figure 9:
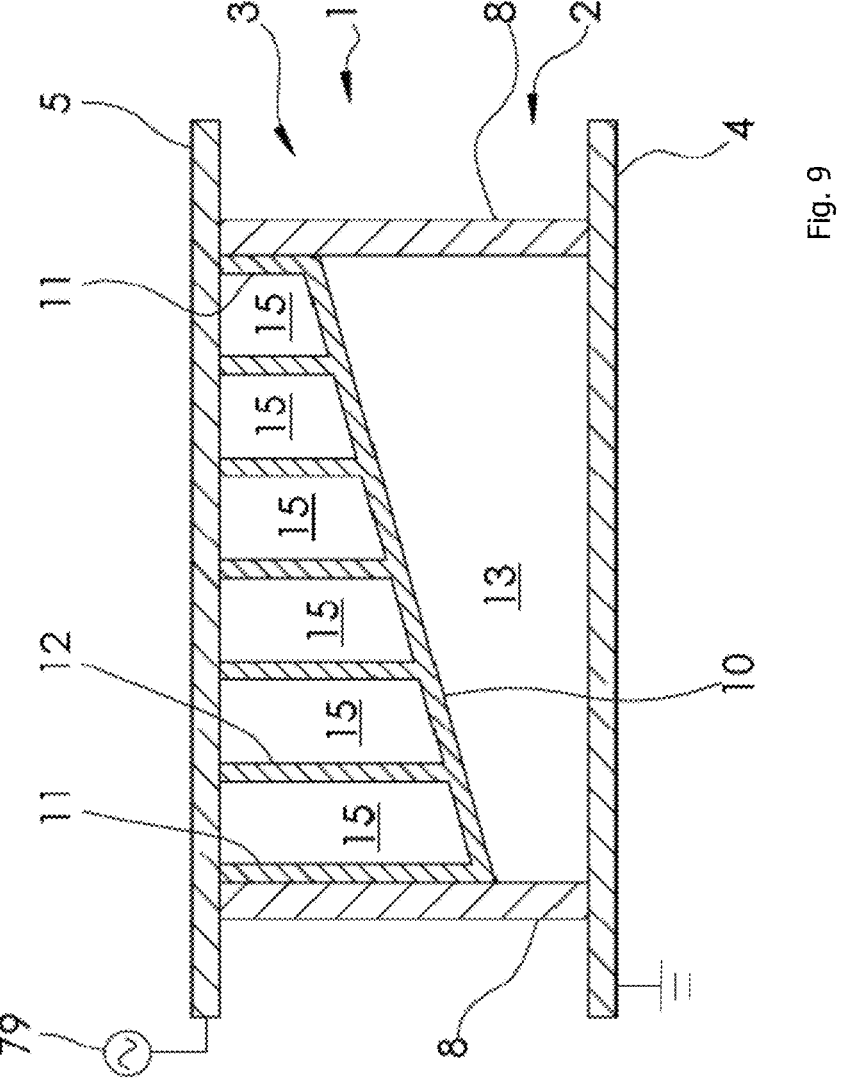
FIG. 9: embodiments of a tool with two mold halves, based on a simulation to determine a field strength pattern in the tool.

For example, one model provides in the section two side walls 8 of the first mold half 2 (FIG. 9), extending between the capacitor plates 4, 5. A base (reference number 7 in FIGS. 1, 3, 5, 6) is not provided in this model. In this model, the capacitor plates 4, 5 extend sideways over the side wall 8 of the first mold half 2. The first capacitor plate 4 is earthed, the second capacitor plate 5 is connected to a wave generator 79. Between the side walls 8, a boundary wall 10 of the second mold half 3 extends in an oblique straight line. From the boundary wall 10, side walls 11 and bars 12 (i.e. supports 11, 12 for the purposes of the invention) lead to the second capacitor plate 5, in order to allow hollow spaces 15 between them (in the section six hollow spaces 15, without restricting the generality). Defined be-tween the first capacitor plate 4, the side walls 8 of the first mold half 2 and the boundary wall 10 is a mold cavity 13, which in this model is wedge-shaped. The side walls 8, 11, boundary wall 10 and bars 12 are of roughly equal strength, have a relative permittivity or around $\varepsilon r=3.2$ and abut one another at an angle. The mold cavity 13 and the hollow spaces 15 are initially empty (i.e. filled with air, $\varepsilon r=1$).

Figure 10:
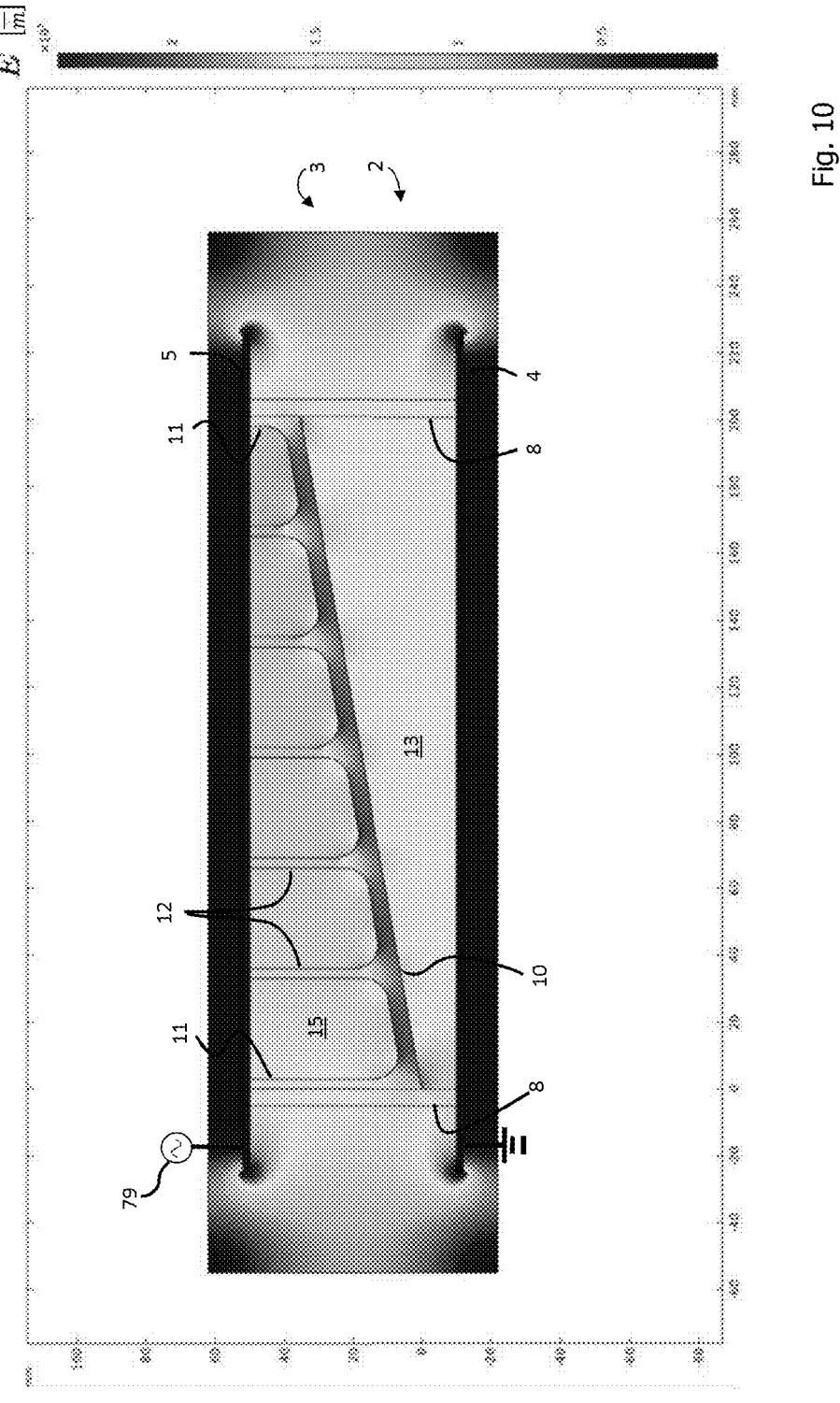
FIG. 10: a field strength pattern in a simulation with the tool of FIG. 8 without trimming bodies.

This model was subjected to a simulation of field strength distribution (FIG. 10). This involved the generation, by means of the wave generator 79, of an electromagnetic field E between the capacitor plates 5, 6, which without disturbances has a field strength of $|E|=1.5$ E5 V/m. In the Figure, contour lines are plotted in gradations of around 0.25 E5 V/m. Of course, the transitions of field strength are not stepped, but fluid. It is shown that field strength declines within the boundary wall 10 to around 0.75 E5 V/m, with the lowest field strength occurring at parts of the boundary wall 10 which bound the hollow spaces 15, while the field strength in parts of the boundary wall 10 which border supports 11, 12 is somewhat higher. Within the supports 11, 12, as also the side wall 8 of the first mold half 2, apart from the points at which they abut the boundary wall 10, the field weakening is negligible. Within the mold cavity 13, at the points lying opposite the supports 11, 12, a locally tightly restricted increase in field strength occurs, similarly at the base of the hollow spaces 15. However, this effect is extremely slight. This is associated with the fact that the field weakening within the supports 11, 12 is, as stated above, negligible.

The practically disappearing field weakening in the supports 11, 12 is at first surprising. On account of the dielectric properties, a field weakening of the order of magnitude of the boundary wall 10 would be expected. Such a field weakening in the supports 11, 12 would also lead to a marked lack of homogeneity of the field in the mold cavity 13 as compared with the supports 11, 12, and would be difficult to handle. The inventors of the present invention have however established, through theoretical considerations, simulations and tests, that such an effect is not present, which makes execution of the invention still practicable. A theoretical explanation for this behaviour is possible if one divides the arrangement between the capacitor plates 4, 5 into small elements in the lateral direction, and then considers the elements, first of all individually, and then superimposed. If one such element contains a support 11, 12 of a dielectric material, a field weakening would actually occur there. This is however superimposed and extinguished by a field strengthening which occurs in the boundary zone of an adjacent element (i.e. extending to the side over the adjacent element).

Figure 11:
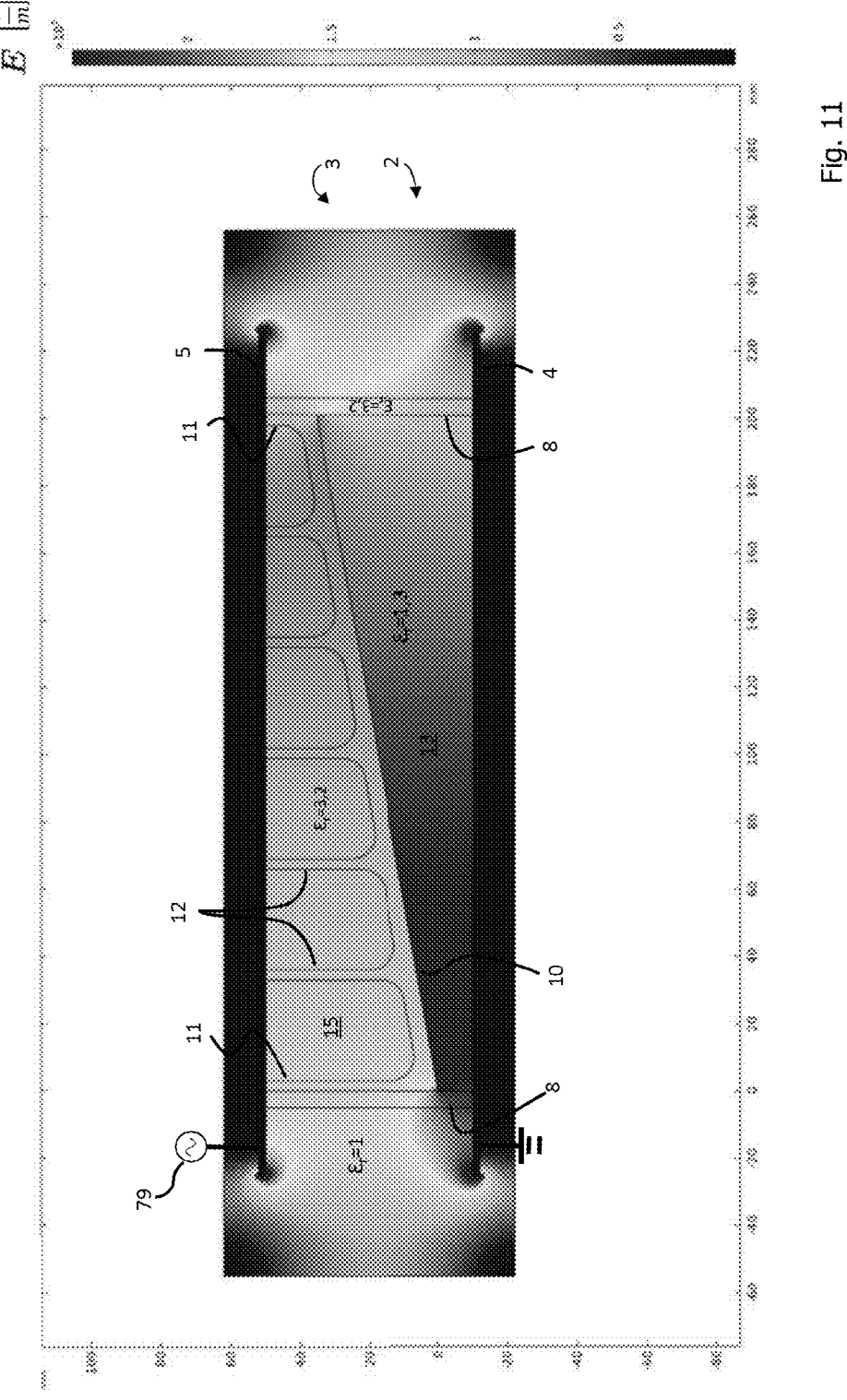
FIG. 11: a field strength pattern in a simulation with the tool according to FIG. 12 with trimming bodies.

On the basis of the same model, a further simulation was conducted, in which the hollow spaces 15 were filled completely with a dielectric having relative permittivity of around $\varepsilon r=3.2$, and the mold cavity 13 was completely filled with a dielectric with a relative permittivity of around $\varepsilon r=1.3$ (FIG. 11). It revealed a marked weakening of the field in the whole area of the second mold half 3 (more precisely, in the left-hand higher area a lower weakening to around 1 to 1.25 E5 V/m, and in the right-hand less high area the greatest weakening, to around 0.75 E5 V/m) and a distinct strengthening of the field in the whole area of the mold cavity 13 (more precisely, in the left-hand less high area the greatest strengthening to over 2.5 E5 V/m, and in the right-hand higher side a lesser strengthening to around 1.75 to 2 E5 V/m).

It has been shown above, that in a tool for the production of particle foam parts by welding of foam particles using electromagnetic waves, a structure of a mold half of a dielectric material with a boundary wall 10 to the mold cavity 13 and supports 11, 12 which form hollow spaces 15 on the side facing away from the mold cavity, make it possible to produce in the mold cavity 13 an electromagnetic field with good homogeneity. Through the optional, targeted and selective introduction of trimming bodies 30, 50 into the hollow spaces 15, the mold half and thus the tool become capable of trimming in the sense that an electromagnetic field in the mold cavity 13 may be influenced in a targeted manner.

A development of the invention provides as further embodiment that the trimming of the mold half may be varied during a foaming process. The foaming process here covers a period from introduction of the foam particles to removal of the particle foam part. Naturally this does not rule out changes to trimming before and/or after the foaming process. For this purpose a trimming body in the form of a fluid is used and this fluid is fed via trimming fluid lines to the hollow space or spaces and/or carried away from the hollow space or spaces. The mold half and/or the associated capacitor plate is or are so designed that this may also occur during a foaming process, i.e. in particular with the tool mounted between the capacitor plates and/or with the mold cavity closed. Alternatively or additionally, the sup-ply/ removal of the trimming fluid may also be effected via a trimming fluid supply unit located between the mold half and the capacitor plate. For example, water, oil or a viscous fluid (e.g. gel) may be used as trimming fluid. In some embodiments, chosen as trimming fluid is a fluid with a low relative permittivity. In these embodiments it is possible to compensate for a change in relative permittivity due to escape of water (vapour) from the mold cavity 13 in the course of the foaming process through targeted introduction or removal of trimming fluid into or from the hollow spaces 15.

Figure 13:
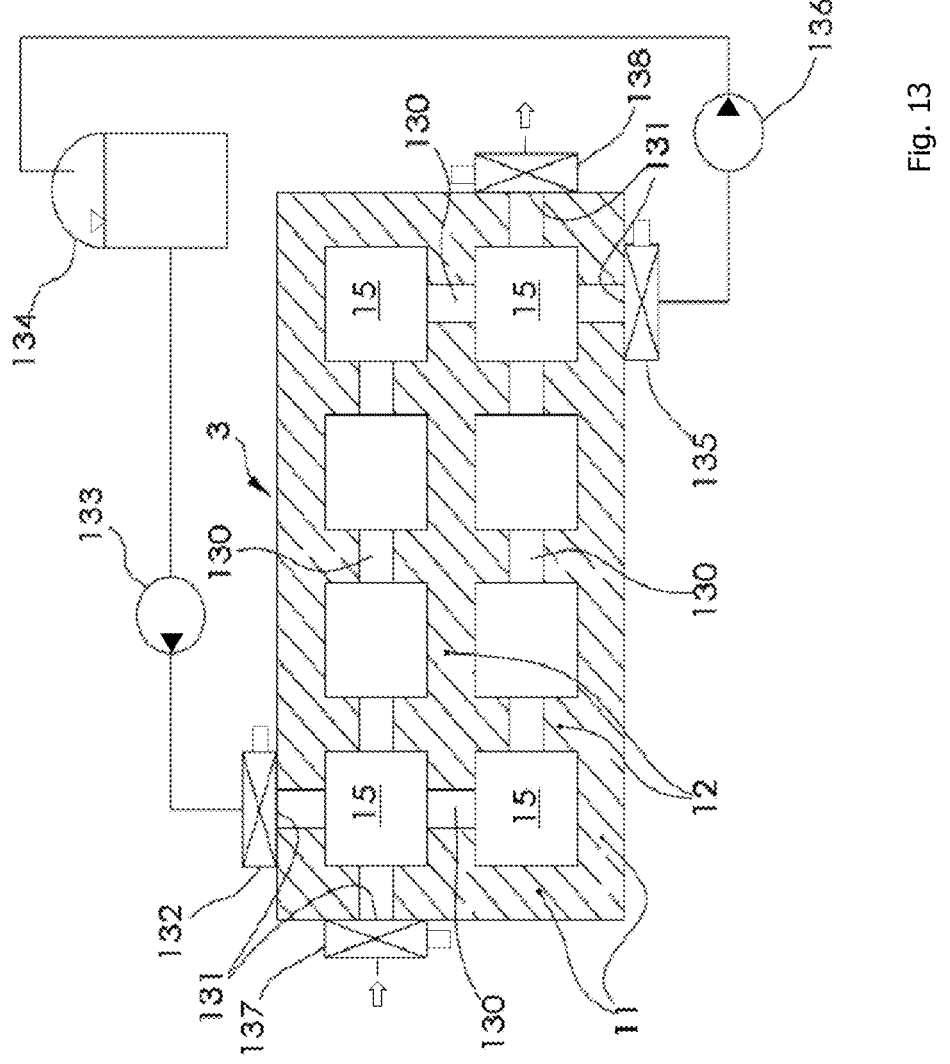
FIG. 13: a mold half of a tool according to further embodiments of the invention.

In some embodiments, bores 130 are provided in the side walls 11 and the bars 12 and connect the hollow spaces 15 in the second mold half 3 for communication purposes (FIG. 13). In the depicted variant, each of the bores 130 is made from one side through a side wall 11, continuously over the whole length or width of the mold half 3, through all bars 12 lying in one line, up to the last hollow space 15 lying on the line, and form in each case at least one opening 131 in a side wall 11. Attached at one of the openings 131 is a trimming fluid feed connection 132 with valve, which is connected to a trimming fluid supply tank 134 via a feed pump 133. Attached to another of the openings 131 is a trimming fluid discharge connection 135 with valve, which is connected to the trimming fluid feed pump 133 via a trimming fluid drain pump 136. Attached to another of the openings 131 is an incoming air connection 137 with valve, while a vent connection 138 with valve is attached to a last of the openings 131. The incoming air connection 137 and the venting connection may each be equipped with a fluid lock. The incoming air connection 137 may be connected to a compressed air tank or an air supply pump, and the venting connection 138 may be connected to a vacuum tank or a vacuum pump.

To fill the hollow spaces 15 with the trimming fluid, the trimming fluid feed connection 132 and the venting connection 138 are opened and the feed pump 133 is set in operation, in order to feed trimming fluid from the trimming fluid supply tank 134 into the hollow spaces 15. Due to the communicating connection via the bores 130, all hollow spaces 15 are reached. Surplus air can escape through the venting connection 138. When the hollow spaces 15 are filled with a predetermined amount of trimming fluid, the trimming fluid feed connection 132 and the venting connection 138 are closed and the feed pump 133 is switched off. The amount of trimming fluid may be determined in advance. Reaching of the predetermined amount may be determined for example by a flow measurement at the feed pump 133 or ensured by design of the latter as a metering pump. Alternatively, complete filling of the hollow spaces 15 may be detected by triggering a fluid lock of the venting connection 138.

To empty the hollow spaces 15, the trimming fluid discharge connection 135 and the incoming air connection 137 are opened, and the trimming fluid drain pump 136 is put into operation, in order to withdraw trimming fluid from the mold half 3 and return it to the trimming fluid supply tank 134. The trimming fluid may therefore also be moved in a circuit. Because of the communicating connection of the bores 130, all hollow spaces 15 are reached. The hollow spaces 15 may be kept unpressurised via the incoming air connection 137, or the removal of trimming fluid may be assisted by compressed air. When the hollow spaces 15 have been emptied, the trimming fluid discharge connection 135 and the incoming air connection 137 are closed and the trimming fluid drain pump 136 is switched off.

The trimming fluid feed connection 132 and/or the trimming fluid discharge connection 135 may each be designed optionally without a valve, if the respective pump 133, 136 has suitable locking devices. Optionally, the pumps 133, 136 may be integrated with the respective trimming fluid connections 132, 135, or attached to the latter, or the valves of the trimming fluid connections 132, 135 may be integrated with or attached to the respective pumps 133, 136.

In the depicted embodiments, each bore 130 ends in the last hollow space 15 lying on the bore line. Alternatively, the bores 130 may also pass via the last hollow space 15 through the adjacent side wall 11. This increases the connection options and, in this way, also facilitates adaptation to circumstances on the equipment side. Openings in the side walls 11 which are not required may be closed by blind plugs.

In some embodiments, the bores 130 may be made on a first plane relative to a height of the mold half 3, and further bores (not explicitly shown) may be made on a second higher plane, wherein the trimming fluid connections 132, 135 are connected to the openings 131 on the first plane, and the incoming air connection 137 and the venting connection 138 are connected to the second plane. Openings in the side walls 11 which are not required are then closed by blind plugs.

Instead of bores, in production of the mold half 3, an additive production process may be used to provide apertures in the side walls 11 and the bars 12. At the same time, additional connections may also be made in the bars 12, without the need for a bore from the outside. This may also avoid the need for unnecessary openings in the side walls 11.

Figure 14:
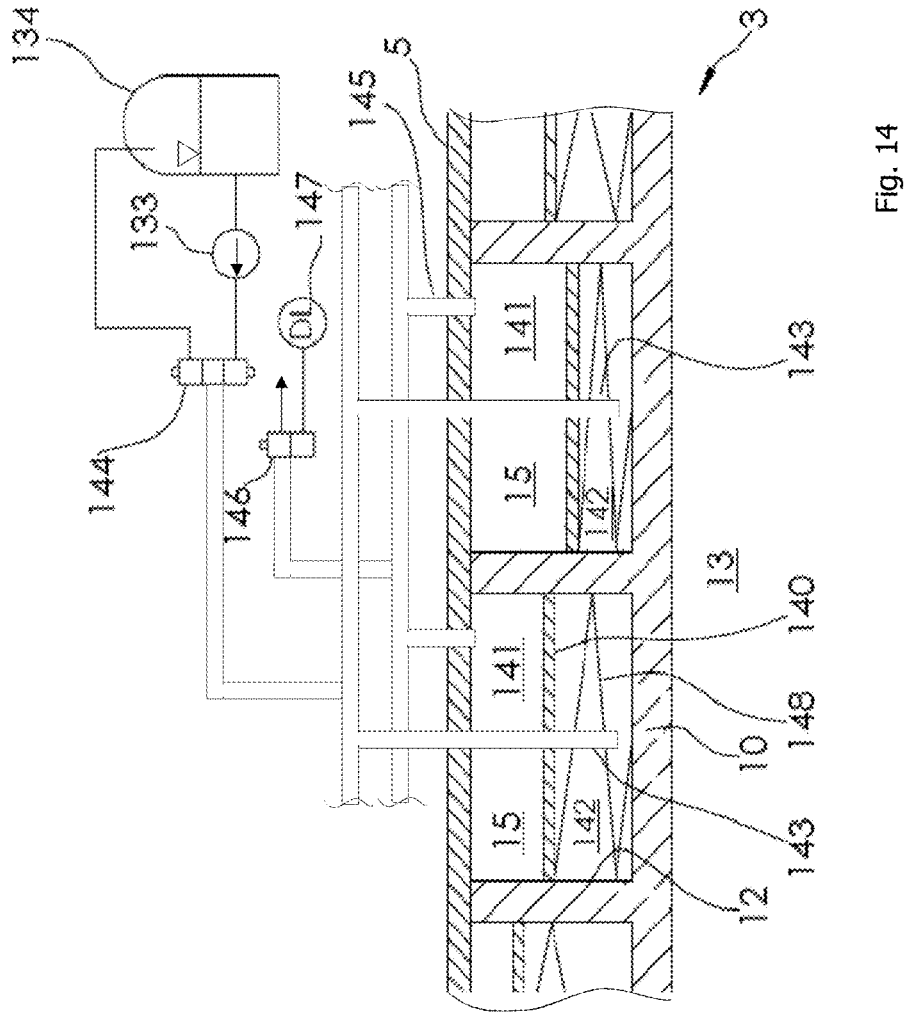
FIG. 14: a mold half of a tool according to yet to further embodiments of the invention

In a further embodiment, covers 140 are provided in each of the hollow spaces 15 of the top mold half 3, dividing each hollow space into a trimming chamber 142 below the cover 140 and a pressure chamber 141 above the cover 140 (FIG. 14). The covers 140 are pushed upwards by respective compression springs 148 mounted in the trimming chamber 142. Through respective bores in the covers 140 and in the capacitor plate 5 bordering the top mold half 3, trimming fluid lines 143 extend into the trimming chamber 142 of each hollow space 15. The trimming fluid lines 143 run together outside the tool and are connected to a trimming fluid valve 144, here in the form of a directional valve. Through the trimming fluid valve 144, in a first switching position, trimming fluid may be fed via a trimming fluid feed pump 133 from a trimming fluid supply tank 134 into the trimming fluid line 143. In a second switching position, the trimming fluid line 143 is connected to a return line in the trimming fluid supply tank 134. In a third switching position (neutral position), all connections of the trimming fluid valve 144 are blocked. Through further bores in the capacitor plate 5, com-pressed air lines 145 extend into the pressure chamber 141 of each hollow space 15. The compressed air lines 145 converge outside the tool and are connected to a compressed air valve 146, which is here in the form of a directional valve. In a first switching position (neutral position), the compressed air line 145 is connected to atmosphere. In a second switching position, the compressed air line 145 is connected to a compressed air tank 147.

To fill the hollow spaces 15 with trimming fluid, the trimming fluid valve 144 is switched from the neutral position into the first switching position, wherein the compressed air valve 146 in the first switching position is connected to atmosphere, and the feed pump 133 is set in operation to feed trimming fluid from the trimming fluid supply tank 134 through the trimming fluid lines 143 into the trimming chambers in the hollow spaces 15. Because of the individual connection via the trimming fluid lines 143 with the trimming fluid feed pump 133, all hollow spaces 15 are filled quickly and simultaneously with trimming fluid. Surplus air can escape via the compressed air valve 146 when the covers 140 in the hollow spaces 15 are pressed upwards.

When the hollow spaces 15 are filled with a predetermined amount of trimming fluid, the trimming fluid valve 144 is switched into the neutral position, thereby blocking any flow of trimming fluid, and the feed pump 133 is switched off. Through the action of the compression spring 148, which presses the covers 140 upwards, the amount of trimming fluid may be equalised between the individual hollow spaces 15. Reaching of the predetermined amount may be determined for example by a flow measurement at the feed pump 133 or ensured by design of the latter as a metering pump.

To empty the hollow spaces 15, the trimming fluid valve 144 is switched into the second switching position, and the compressed air valve is switched into the second switching position in order to supply the pressure chambers 141 of the hollow spaces 15 with compressed air. The compressed air in the pressure chambers 141 presses the covers 140 down, so that the trimming fluid in the trimming chambers 142 is pressed into the trimming fluid lines 143 and out of the mold half 3 and is returned to the trimming fluid supply tank 134. Consequently, the trimming fluid too may also be circulated. Due to the individual connection via the compressed air lines 145 with the compressed air tank 147, all hollow spaces 15 are emptied simultaneously and quickly. When this process has been completed, the trimming fluid valve 144 is switched into the neutral position and the compressed air valve 146 again connected to atmosphere.

In a modification (not shown in detail), the trimming fluid lines 143 may be connected individually to respective trimming fluid valves for each hollow space 15. The trimming fluid valves may be attached to the capacitor plate 5 or accommodated or combined in a separate control unit. Here the trimming fluid valves may be of the same design as the trimming fluid valve 144 and connected by the respective different routes with the trimming fluid feed pump 133 via a common trimming fluid feed line, or with the trimming fluid supply tank 134 via a common trimming fluid return line.

In a further modification (not shown in detail), the compressed air lines 145 may be connected individually to respective compressed air valves for each hollow space 15. The compressed air valves may be attached to the capacitor plate 5 or accommodated or combined in a separate control unit. Here the compressed air valves may be of the same design as the compressed air valve 146 and connected by the respective different routes with the compressed air tank 147 via a common compressed air line or, if applicable, connected to atmosphere via a common venting line.

In a further modification (not shown in detail), sections of the trimming fluid lines 143 and/or the compressed air lines 145 may be attached separately to an inside and/or an outside of the capacitor plate 5. At the same time the bores in the capacitor plate 5 may be provided for example with threads, so that an inner part of the trimming fluid lines 143 and/or the compressed air lines 145 may be screwed to the inside of the capacitor plate 5, and an outer part of the trimming fluid lines 143 and/or the compressed air lines 145 may be screwed to the outside of the capacitor plate 5. For example, an inner part of the trimming fluid lines 143 may be a pipe section with a threaded end. Moreover, an inner part of the trimming fluid lines 143 may be of varying length, depending on the depth of the hollow space 15 to be supplied.

In a development of the last-mentioned modification, a connection plate (not shown in detail) may be provided, carrying sections of the trimming fluid lines 143 and/or the compressed air lines 145 facing into the hollow spaces 15. The sections of the trimming fluid lines 143 may here for example be in the form of pipe sections, which are firmly joined to the connection plate or may be attached to it, for example using screws, insertion or bonding in suitable bores. The sections of the compressed air lines 145 may be designed in a similar manner and attached or be simple openings of corresponding bores, since the compressed air lines 145 need not extend into the hollow spaces 15. At the same time, bores in the capacitor plate 5 may line up with bores in the intermediate plate, so that sections of the trimming fluid lines 143 and/or the compressed air lines 145 which are attached to the connection plate, may be inserted from the outside, through the bores, into the capacitor plate 5, so that a reliable alignment of the connection plate and the capacitor plate is also ensured. The outer parts of the trimming fluid lines 143 and the compressed air lines 145 are then to be attached to the outside of the connection plate. The connection plate may be made for example of metal or plastic. The connection plate may be made conventionally by providing a plate and pipes, where applicable with suitable machining and assembly. Alternatively, the connection plate including any pipes of the lines 143, 145 may be made in one piece by an additive production process.

In one variant, the connection plate is/may be located between the mold half 3 and the capacitor plate 5. In this case too, bores in the capacitor plate 5 may be aligned with bores in the intermediate plate. Then, however, the outer-lying parts of the trimming fluid lines 143 and the compressed air lines 145 are to be attached to the outside of the capacitor plate 5. In addition, in this variant, short pipe sections may be located as sections of the compressed air lines 145 on the outside of the connection plate and may be insertable into the corresponding bores of the capacitor plate so that in this case too, a reliable alignment of the connection plate and the capacitor plate is ensured. If the connection plate of this variant is made of metal, it may act as a functional part of the capacitor plate 5 in respect of the generation of the electromagnetic field. If the connection plate of this variant is made of plastic, it can contribute to the dielectric effect of mold half 3.

In a further modification, it is possible to provide a connection plate 150 (FIG. 15), which holds or has sections of the trimming fluid lines 143 and the compressed air lines 145, wherein the sections of the lines 143, 145 facing towards the mold half open in the surface of the connection plate 150 and the outwards-facing sections of the lines 143, 145 open at a side edge or several side edges of the connection plate 150. A switch unit with valves may also be provided there. Specifically, the connection plate 150 may have a cuboid shape with an inner surface 151, an outer surface 152 opposite the former, a first side face 153 which connects the inner surface 151 and the outer surface 152, a second side face 154 which adjoins the first side face 153, and other side faces which lie opposite the first side face 153 and second side face 154 respectively. The inner surface 151 has a first group of bores 155, each carrying a pipe section 156, and a second group of bores 157. The first side face 153 carries in a plane close to the outer surface 152 a group of third bores 158, each meeting on a row of the first group of bores 155. The second side face 154 carries in a plane close to the inner surface 151 a group of fourth bores 159, each meeting on a row of the second group of bores 157. The first group of bores 155 is offset diagonally relative to the second group of bores 157, and the third group of bores 158 is offset vertically relative to the fourth group of bores 159, so that the bores 155 of the first group communicate only with bores 158 of the third group and vice-versa, and the bores 157 of the second group communicate only with bores 159 of the fourth group and vice-versa. Thus the bores 155 of the first group with pipe sections 156 and the bores 158 of the third group respectively form sections of the trimming fluid line 143, and the bores 157 of the second group and the bores 159 of the fourth group respectively form sections of the compressed air line 145 (cf. FIG. 14), and the trimming fluid line 143 has no overlaps with the compressed air line 145.

The openings of the bores 158, 159 may be connected to one another by respective line sections of connection units. All bores 155, 157, 158, 159 are, in some embodiments, in the form of blind holes. If they are in the form of through bores, one side of each should be closed by blind plugs.

Although not shown in detail, the bores 158 of the third group may be connected to one another by a first collective bore in the second side face 154 or the side face lying opposite the former, and the bores 159 of the fourth group may be connected to one another by a second collective bore in the first side face 153 lying opposite the former. The bores 158, 159 of the third and fourth groups may then be closed by blind plugs, and only the first collective bore need be connected to the trimming fluid valve 144 and the second collective bore to the compressed air valve 146.

Figure 15:
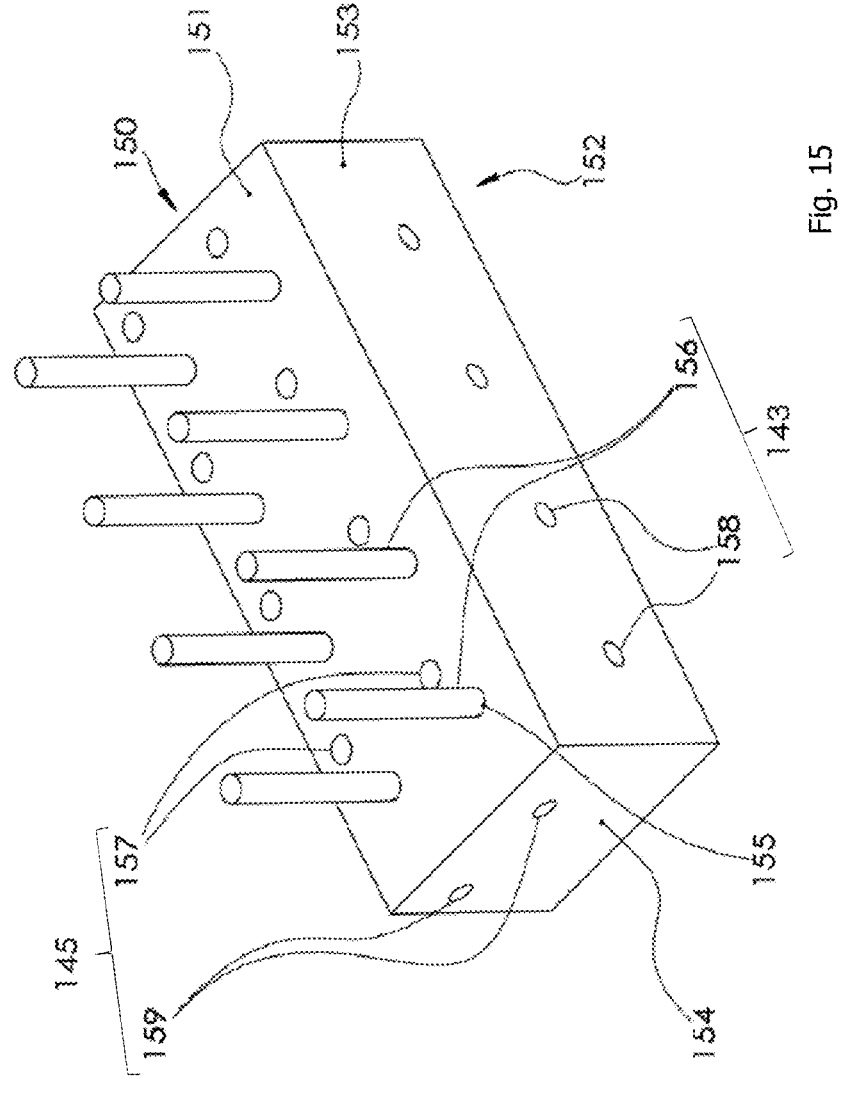
FIG. 15: a connection plate for use on a tool according to yet to further embodiments of the invention

It goes without saying that the specific arrangement of the bores 155, 157, 158, 159 in FIG. 15 is to be understood as purely exemplary. In particular, the bores 158, 159 of the third and fourth groups may also be made on a single side face 153 or 154, in that case even on a single plane, without the occurrence of overlaps between the trimming fluid line 143 and the compressed air line 145. The arrangement shown in FIG. 15 has however the advantage that the media trimming fluid and compressed air are separated from one another from the technical connection standpoint.

Otherwise, the explanations made in respect of the connection plate described earlier, with regard to layout, material and method of production may be transferred equally to the connection plate 150 described here.

Figure 16:
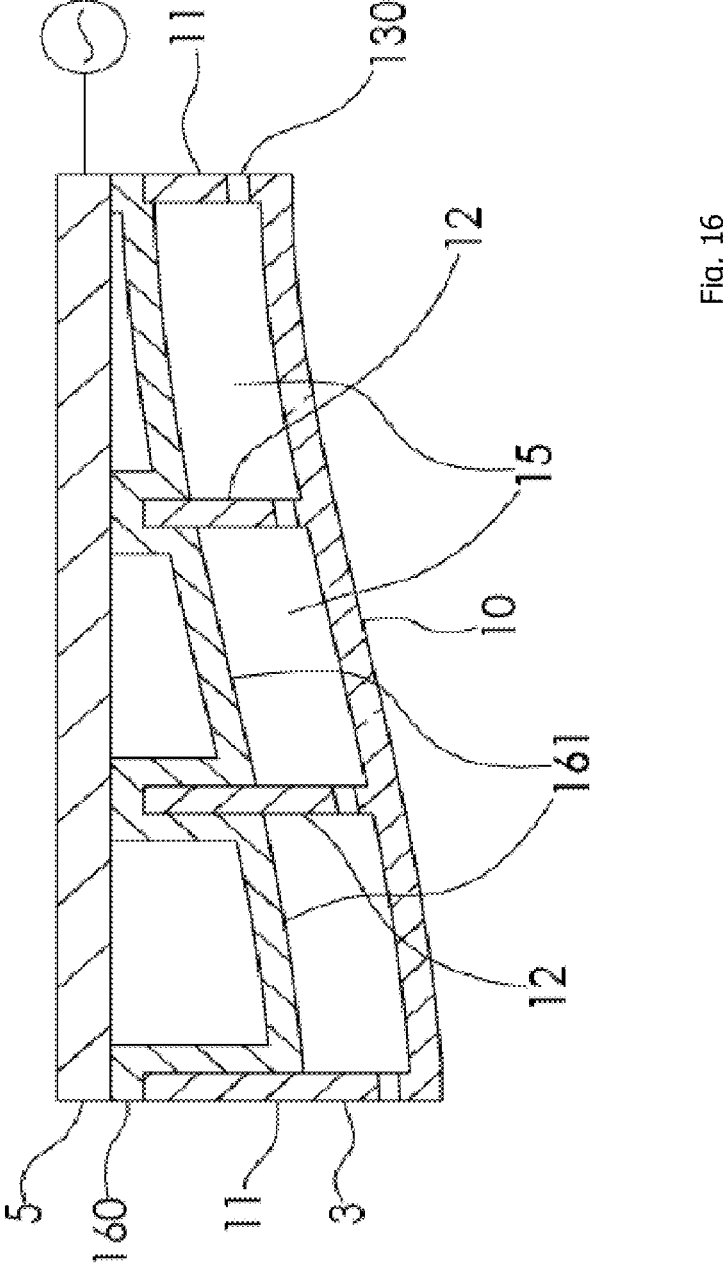
FIG. 16: a mold half of a tool according to yet to further embodiments of the invention

In a further modification, a cover plate 160 may also be provided. This is arranged between the mold half 3 and the capacitor plate 5 and has several projections which extend into the hollow spaces 15 and limit their volume (FIG. 16). Analogous to the arrangement shown in FIG. 13, at least one bores 130 may be provided in the top mold half 3, forming in at least one side wall 11 a connection opening for trimming fluid and cutting through at least one of the bars 12, in order to connect several hollow spaces 15 of the mold half 3 with fluidic communication. The arrangement of the bores may be in principle as desired, so long as trimming fluid may be fed to and removed from, or directed through, all hollow spaces. The projections 161 are, in some embodiments, so dimensioned that the volumes remaining in the hollow spaces 15 are substantially of equal height, but this too is optional and may be adapted to requirements. In variants, the projections 161 may be interchangeable elements of different height, which may be attached to the cover plate. The bore or bores 130 is or are so designed that they lie in the range of the volumes left by the projections 161, and in addition in such a way that all volumes remaining in the hollow spaces 15 may be filled with trimming fluid and as far as possible completely emptied afterwards. Thus for example in FIG. 16 an opening made through the bore 130 at the top of the right-hand side wall 11 may serve as a feed connection for trimming fluid, and an opening made through the bore 130 at the bottom of the left-hand side wall 11 may serve as a discharge connection for trimming fluid, so that gravity may be utilised in both supply and removal of the trimming fluid. The cover plate 160 may in principle be made by a casting process, by deep-drawing a plate, by milling out and/or drilling from a solid piece or by an additive process. In the case of an additive process (3D printing), no bores are necessary, but instead all connection openings may be made in one go with the additive formation of the cover plate 160.

Figure 17:
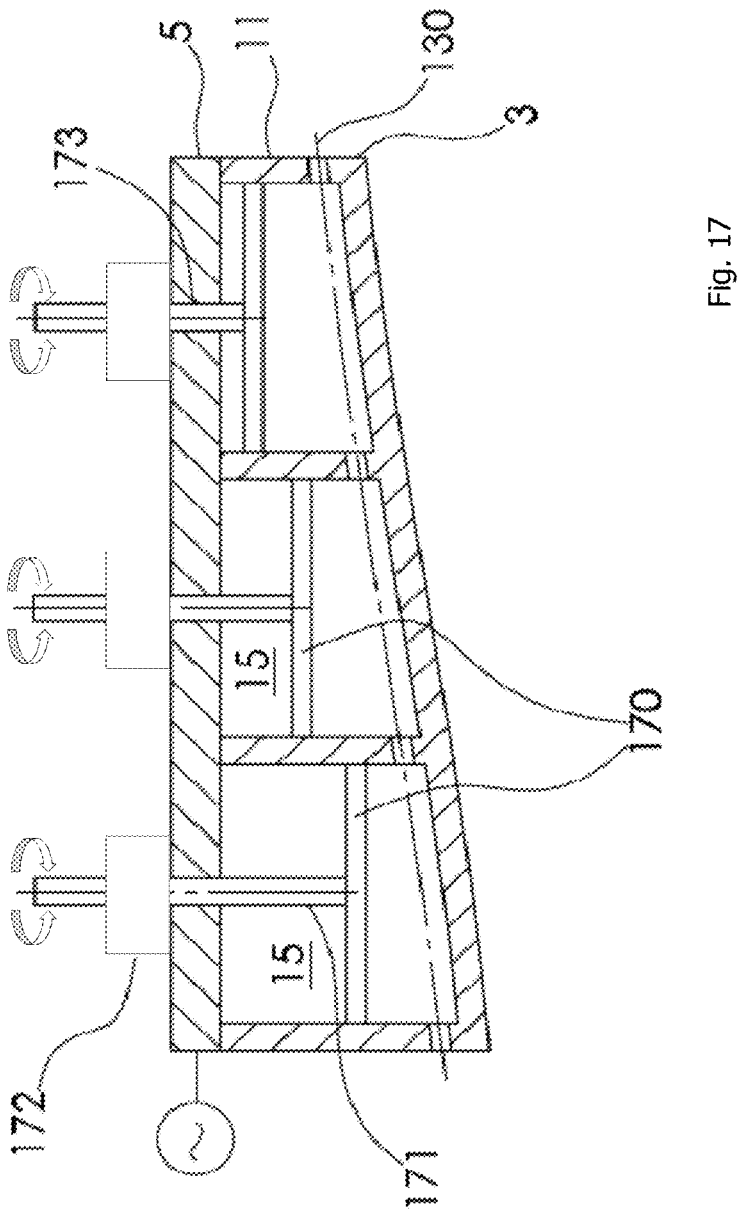
FIG. 17: a mold half of a tool according to yet to further embodiments of the invention

In a further embodiment, covers 170 may be provided, each arranged in one of the hollow spaces 15 with vertical movement facility and individually height-adjustable via a tappet 171 and a lifting drive 172 attached to the top capacitor plate 5 (FIG. 17). The tappets 171 are mounted in bores 173 of the top capacitor plate. The tappets 171 may be in the form of threaded rods, screwed into bores 173 provided with inside thread, and may be turned by the lifting drive 172 in the form of a rotary drive via a driving slot (not shown in detail), so that by turning in the (threaded) bores 173 an adjustment in height may be effected. Other facilities for height adjustment are well-known in the technology and may be used alternatively, depending on requirements. As in FIG. 17, at least one bore 130 is provided to supply the hollow spaces 15 with trimming fluid; in this respect the explanations given above apply. Through the height-adjustment, the covers are able to delimit the volume of the hollow spaces 15 individually (FIG. 16). Thus, the relative permittivity of the mold halves may not only be matched locally but may also be varied in the course of the foaming process. In addition, expelling of the trimming fluid through the bore 130 may also be assisted by closing of the cover.

Naturally, everything described above relating to the top mold half 3 is applicable correspondingly and analogously to the bottom mold half 2.

Figure 18A:
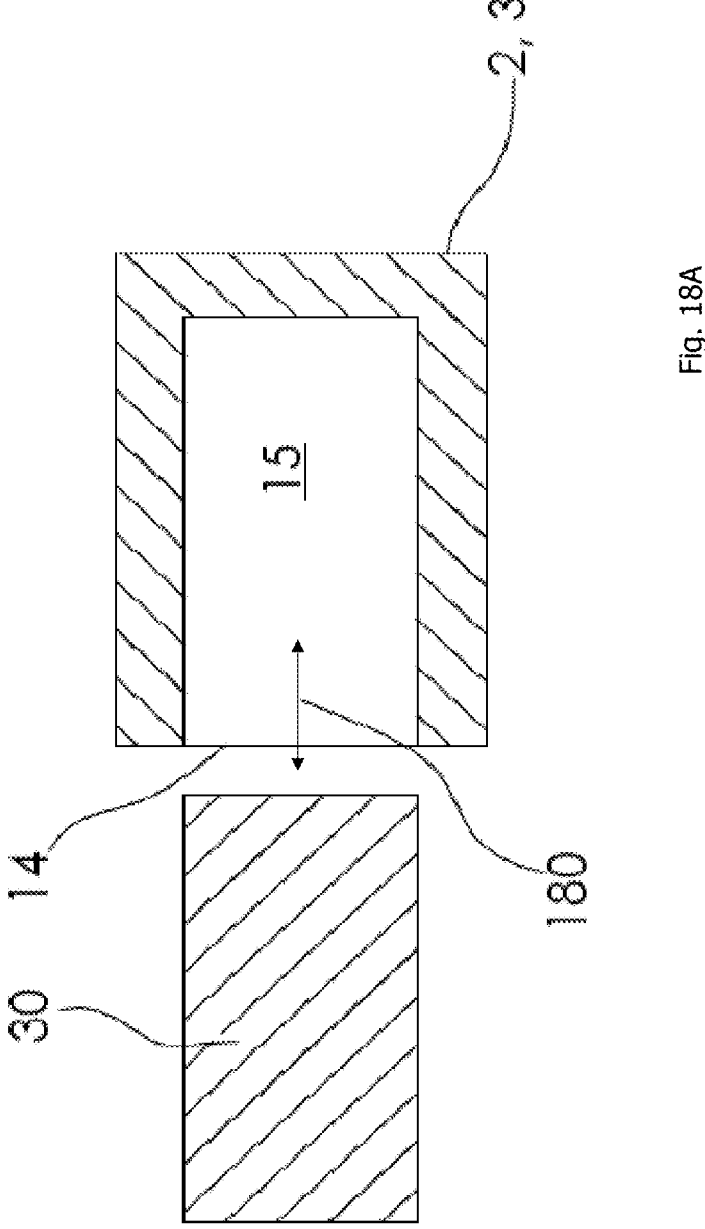
FIG. 18A: a mold half of a tool with trimming bodies according to to further embodiments of the invention, in cross-section
Figure 18B:
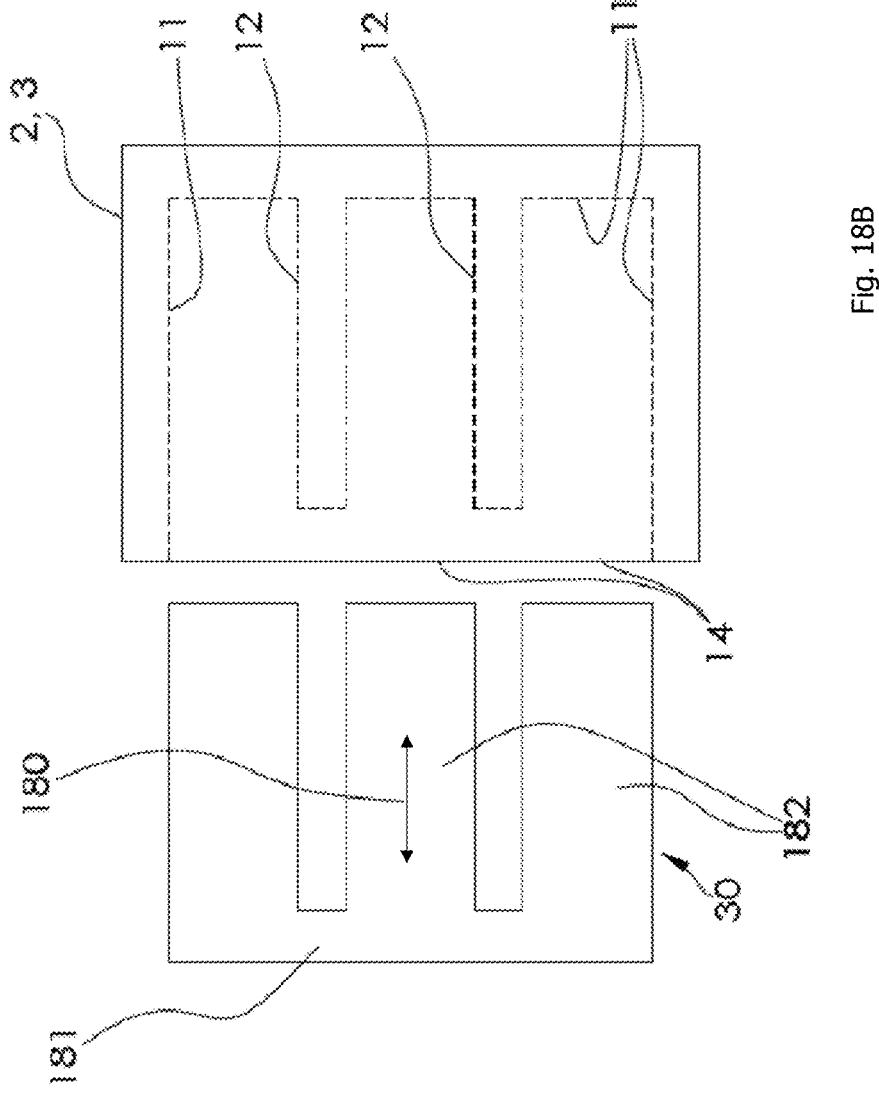
FIG. 18B: the mold half with trimming bodies of FIG. 18A, viewed from above
Figure 18C:
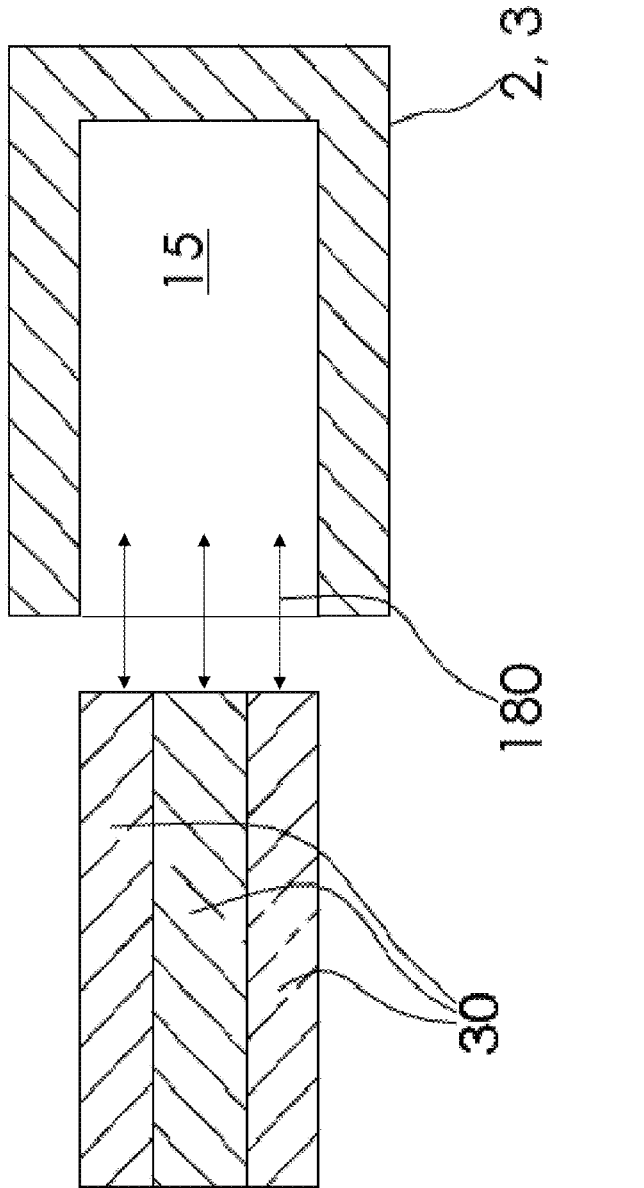
FIG. 18C: the mold half with trimming bodies of FIG. 18A, in embodiments.

According to a further embodiment, one of the mold halves 2, 3 may also have a side opening or several side openings 14, into which a mold body 30 may be inserted and removed from the side (FIG. 18A, direction of movement 180). The mold body 30 may be comb-shaped with a base 181 and several cuboid prongs 182 (FIG. 18B). Alternatively, several individual cuboid mold bodies 30 may be used which, if applicable, may be moved into and out of the hollow spaces 15 under individual control. A tool system with such mold halves 2, 3 and mold bodies 30 is especially, but not only, suitable for the production of particle foam part with the aid of electromagnetic waves. In a development, several mold bodies 30 in the form of plates of the same shape as described above, but of lower height, may be provided; together they fill the hollow spaces 15 and may be moved into and out of the hollow spaces 15 under individual control (FIG. 18C).

Pumps 133, 136, connections 132, 135, 137, 138, valves 144, 146, tanks 134, 147, lines 143, 145 and other pipework may be, individually and in any arrangement and/or subcombination, part of a trimming fluid supply system. A control unit for control of all process operations described including the activation of motors, pumps, valves, and the provision of suitable sensors to provide process and status data for the control unit as required, are a matter of course and need no further explanation.

Further exemplary embodiments of the present invention are described in the following list, which is provided to further facilitate the understanding of the scope and features of the present invention:

1. Tool for the production of particle foam parts through the welding of foam particles by means of electromagnetic waves, comprising two mold halves which bound a mold cavity, wherein at least one of the two mold halves is made of a material which is transparent to electromagnetic waves and has a boundary wall which bounds the mold cavity and at least one support serving to support the boundary wall on a capacitor plate on the side facing away from the mold cavity and forming at least one hollow spaces.

2. Tool according to embodiment 1, characterised in that the boundary wall is made with substantially constant thickness.

3. Tool according to embodiment 1 or 2, characterised in that the supports run roughly parallel to a pressing direction, in which the two mold halves in operation are pressed together by a press.

4. Tool according to one of the preceding embodiments 1-3, characterised in that it has connections for a tempering medium, which may flow through the one or the several hollow spaces.

5. Tool according to one of the preceding embodiments 1-4, characterised in that at least one of the two mold halves is designed for trimming the mold half by means of the at least one support and/or the one or several hollow spaces, in order to influence an electromagnetic field.

6. Tool according to one of the preceding embodiments 1-5, characterised in that the hollow space or at least one of the several hollow spaces has an opening, through which a trimming body may be inserted into the hollow space.

7. Tool according to embodiment 6, characterised in that the opening faces the side facing away from the mold cavity.

8. Tool according to embodiment 6 or 7, characterised in that the hollow space or at least one of the several hollow spaces has a mold- or latching element for positioning and/or fixing a trimming body in the hollow space.

9. Tool according to one of the preceding embodiments 1-8, characterised in that the mold half or halves has or have at least one connection for a trimming fluid, in particular liquid or oily or viscous, which is connected to at least one of the one or several hollow spaces, wherein, in some embodiments, several hollow spaces are connected for fluidic communication with one another, or at least part-volumes of several hollow spaces are separated from one another with fluid-tightness.

10. Tool according to embodiment 9, characterised in that the mold half or halves has or have at least one connection for compressed air and/or vacuum, which is connected to at least one of the one or several hollow spaces, wherein, in some embodiments, the connection or connections for compressed air and/or vacuum is or are arranged on a higher plane than the connection or connections for trimming fluid.

11. Tool according to embodiment 4, 9 or 10, characterised in that the hollow spaces are connected through connection openings in the supports, wherein the connection openings or a group of connection openings are, in some embodiments, flush with at least one of the connections made in a side wall for tempering medium, trimming fluid, compressed air or vacuum.

12. Tool according to one of the preceding embodiments 1-11, characterised in that each of the mold halves is made of a material transparent to electromagnetic waves, and has the boundary wall and the support(s).

13. Tool system for the production of particle foam parts, characterised in that the tool system includes a tool according to one of the embodiments 1-12, and at least one trimming body which is designed for insertion in the hollow space or at least one of the hollow spaces, and/or a has trimming fluid provision device which is designed to supply the mold half or mold halves with trimming fluid.

14. Tool system according to embodiment 13, characterised in that the trimming body is made of a material with a relative permittivity ($\varepsilon r$) of at least 2.

15. Tool system according to embodiment 13 or 14, characterised in that the trimming body is made from a solid body or is produced by pouring a setting material into at least one of the hollow spaces.

16. Tool system according to one of the preceding embodiments 13-15, characterised in that the trimming body is designed as a plug-in body for plugging into the hollow space or at least one of the hollow spaces.

17. Tool system according to embodiment 16, characterised in that the trimming body has a shaped element or a latching element for positioning and/or fixing in the hollow space or at least one of the hollow spaces, or may be fixed by frictional locking in the hollow space or at least one of the hollow spaces.

18. Tool system according to one of the preceding embodiments 13-17, characterised in that the trimming body is so designed that it fills only a partial area of the hollow space or one of the hollow spaces, wherein the partial area is, in some embodiments, a partial area located away from the mold cavity.

19. Tool system according to one of the preceding embodiments 13-18, characterised in that it includes trimming bodies of differing size and/or of different materials which have differing relative permittivity ($\varepsilon r$).

20. Tool system according to one of the preceding embodiments 13-19, characterised in that it has a connection plate which is to be arranged between a capacitor plate and one mold half of the tool, or on a side of a capacitor plate facing away from a mold half of the tool, and which has the media connections and/or media passages and/or media openings for the supply and/or removal of media from or to the outside and to or from the hollow spaces of the mold half, wherein the connection plate, in some embodiments, has pipe sections which, when the connection plate is fitted as specified, extend into the hollow spaces of the mold half.

21. Method for the production of at least one particle foam parts by the welding of foam particles using electromagnetic waves, wherein a tool with mold halves forming a mold cavity is arranged between two capacitor plates, the mold cavity is filled with foam particles, the tool is closed by bringing the two mold halves together, and the tool with the foam particles is subjected to electromagnetic waves, in particular radio waves or microwaves, introduced into the mold cavity via the capacitor plates, wherein the foam particles are heated by the electromagnetic waves and at least partially fuse or bake together, wherein the method is implemented using the tool according to one of the preceding embodiments 1-11 or a tool system according to one of the preceding embodiments 12-20.

22. Method according to embodiment 21, characterised in that at least one trimming bodies or a trimming fluid may be provided in the hollow space or at least one of the hollow spaces, in order to influence an electromagnetic field in the mold cavity.

23. Method according to embodiment 21 or 22, characterised in that, depending on the quality of the welding of the foam particles, the arrangement of at least one trimming bodies or a trimming fluid in the tool is changed, in order to adjust the influencing of the electromagnetic field in the mold cavity.

24. Method according to one of the preceding embodiments 21-23, characterised in that, the arrangement of at least one trimming bodies or a trimming fluid in the tool is varied during a foaming process, in order to have dynamic influence on an electromagnetic field in the mold cavity.

It is once again pointed out that all of the features and options described above in the list of embodiments 1-24 may, in particular, be used—individually and/or in different combinations or sub-combinations—in the context of the method for the manufacture of a shoe sole as described in more detail farther above in the present application.

The invention has been described completely above with the aid of embodiments. The invention is however defined only by the appended independent claims and is further developed by the dependent claims. To the extent that the embodiments contain individual features which go beyond the dependent claims, these are for illustration only, but are not intended to limit the invention, even if they may contain further inventive ideas. All features which are described in relation to an embodiment, a variant, alternative or option, are also to be related to all other embodiments, variants, alternatives or options, unless clearly excluded. In addition, all features which are described in relation to an embodiment, a variant, alternative or option, also individually or in any desired sub-combination with one another and/or with features of other embodiments, variants, alternatives or options, define in each case independent subjects of the invention.

LIST OF REFERENCE NUMBERS 1 tool
2 first (bottom) mold half (die mold half)
3 second (top) mold half (punch mold half)
4 first capacitor plate (bottom capacitor plate)
5 second capacitor plate (top capacitor plate)
6 waveguide connection
7 base
8 side wall
9 filler hole
10 boundary wall
11 side walls (support)
12 bar (support)
13 mold cavity
14 opening
15 hollow space
30 trimming body
41 step
42 rim
43 latching arrangement
50 trimming body
61 fluid inflow orifice
62 fluid outlet orifice
63 fluid throughflow orifice
64 fluid flow connection
65 fluid return connection
66 valve
67 fluid source
70 apparatus
71 supply tank
72 filler hose
73 press
74 press table 75 press punch
76 cylinder-piston unit
77 frame
78 waveguide
79 wave generator
80 voltage source
81-83 areas
130 bore
131 opening
132 trimming fluid feed connection (valve)
133 trimming fluid feed pump
134 trimming fluid supply tank
135 trimming fluid discharge connection (valve)
136 trimming fluid drain pump
137 incoming air connection (valve)
138 venting connection (valve)
140 cover
141 pressure chamber
142 trimming chamber
143 trimming fluid line
144 trimming fluid valve
145 compressed air line
146 compressed air valve
147 compressed air tank
148 compression spring
150 connection plate
151 inner surface (to tool)
152 outer surface (to capacitor plate)
153 side face
154 side face
155 bore (first group)
156 pipe section
157 bore (second group)
158 bore (third group)
159 bore (fourth (group)
160 cover plate
161 projection
170 cover
171 tappet
172 lifting drive
173 bore The above list is an integral part of the description.

In the following, further embodiments are described to facilitate the understanding of the invention:

1. Method for the manufacture of a shoe sole by the welding of foam particles using electromagnetic waves,
   a. wherein a tool with two mold halves forming a mold cavity corresponding to the shape of the shoe sole is arranged between two capacitor plates,
   b. wherein the mold cavity is filled with the foam particles,
   c. wherein the tool is closed by bringing the two mold halves together,
   d. wherein the closed tool with the foam particles in the mold cavity is subjected to electromagnetic waves, in particular radio waves or microwaves, introduced into the mold cavity via the capacitor plates,
   e. wherein the foam particles are heated by the electromagnetic waves and at least partially fuse or bake together, and
   f. wherein at least one of the two mold halves is made of a material which is transparent to electromagnetic waves, has a boundary wall which bounds the mold cavity, and has at least one support which serve to support the boundary wall on the capacitor plate on the side facing away from the mold cavity and which form at least one hollow spaces.

2. Method according to embodiment 1, wherein at least one trimming bodies or a trimming fluid are be provided in the hollow space or at least one of the hollow spaces, in order to influence an electromagnetic field in the mold cavity.

3. Method according to embodiment 2, wherein, depending on the quality of the welding of the foam particles, the arrangement of the at least one trimming bodies or the trimming fluid in the tool is changed, in order to adjust the influencing of the electromagnetic field in the mold cavity.

4. Method according to one of embodiments 2 or 3, wherein the arrangement of the at least one trimming bodies or the trimming fluid in the tool is varied during steps d. and e., in order to have dynamic influence on the electromagnetic field in the mold cavity.

5. Method according to one of embodiments 1-4, wherein the boundary wall is made with substantially constant thickness.

6. Method according to one of embodiments 1-5, wherein the at least one support runs roughly parallel to a pressing direction, in which the two mold halves in operation are pressed together by a press.

7. Method according to one of embodiments 1-6, wherein the tool further has connections for a tempering medium, which flows through the one or the several hollow spaces.

8. Method according to one of embodiments 2-7, wherein the hollow space or at least one of the several hollow spaces has an opening through which the at least one trimming bodies are inserted.

9. Method according to embodiment 8, wherein the opening faces the side facing away from the mold cavity.

10. Method according to embodiment 8 or 9, wherein the hollow space or at least one of the several hollow spaces has a mold- or latching element for positioning and/or fixing the at least one trimming bodies in the hollow space.

11. Method according to one of embodiments 2-10, wherein the mold half or halves has or have at least one connection for the trimming fluid, which is connected to at least one of the one or several hollow spaces, wherein, in some embodiments, several hollow spaces are connected for fluidic communication with one another, or at least part-volumes of several hollow spaces are separated from one another with fluid-tightness.

12. Method according to embodiment 11, wherein the mold half or halves has or have at least one connection for compressed air and/or vacuum, which is connected to at least one of the one or several hollow spaces, wherein, in some embodiments, the connection or connections for compressed air and/or vacuum is or are arranged on a higher plane than the connection or connections for the trimming fluid.

13. Method according to one of embodiments 7, 11 or 12, wherein the hollow spaces are connected through connection openings in the supports, wherein the connection openings or a group of connection openings are, in some embodiments, flush with at least one of the connections made in a side wall for the tempering medium, the trimming fluid, the compressed air or the vacuum.

14. Method according to one of embodiments 1-13, wherein each of the mold halves is made of a material transparent to electromagnetic waves and has the boundary wall and the support(s).

15. Method according to one of embodiments 2-14, wherein the at least one trimming bodies are made of a material with a relative permittivity ($\varepsilon r$) of at least 2.

16. Method according to embodiment 15, wherein the at least one trimming bodies are made from a solid body or are produced by pouring a setting material into at least one of the hollow spaces.

17. Method according to one of embodiments 15 or 16, wherein the at least one trimming bodies are designed as a plug-in body for plugging into the hollow space or at least one of the hollow spaces.

18. Method according to embodiment 17, wherein the at least one trimming bodies have a shaped element or a latching element for positioning and/or fixing in the hollow space or at least one of the hollow spaces or may be fixed by frictional locking in the hollow space or at least one of the hollow spaces.

19. Method according to one of embodiments 14-18, wherein the at least one trimming bodies are so designed that they fill only a partial area of the hollow space or one of the hollow spaces, wherein the partial area is, in some embodiments, a partial area located away from the mold cavity.

20. Method according to one of embodiments 1-19, wherein the foam particles comprise at least one of: expanded thermoplastic polyurethane, eTPU; expanded polyether-block-amide, ePEBA; expanded polyamide, ePA.

21. Shoe sole, in particular insole or midsole, manufactured with a method according to one of embodiments 1-20.

22. Shoe, in particular sports shoe, comprising a shoe sole according to embodiment 21.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tool for the manufacture of a shoe sole, the tool comprising two mold halves forming a mold cavity corresponding to the shape of the shoe sole between two capacitor plates, wherein at least one of the two mold halves is made of a material which is transparent to electromagnetic waves, has a dielectric boundary wall which bounds the mold cavity, and has at least one support which serves to support the boundary wall on the capacitor plate on the side facing away from the mold cavity and which form at least one hollow space, and wherein at least one trimming body or a trimming fluid is provided in at least one of the at least one hollow space, abutting the boundary wall, and wherein when a trimming fluid is provided, the trimming fluid is water, oil, or gel.

2. The tool according to claim 1, wherein the boundary wall and the at least one support are monolithic.

3. The tool according to claim 1, wherein the boundary wall has a substantially constant thickness.

4. The tool according to claim 1, wherein the at least one support runs roughly parallel to a pressing direction.

5. The tool according to claim 1, wherein the tool further has connections for a tempering medium, which flows through the one or the several hollow spaces.

6. The tool according to claim 1, wherein the hollow space or at least one of the several hollow spaces has an opening through which the at least one trimming bodies are inserted.

7. The tool according to claim 6, wherein the opening faces the side facing away from the mold cavity.

8. The tool according to claim 1, wherein both of the two mold halves are made of a material which is transparent to electromagnetic waves.

9. The tool according to claim 1, wherein at least one of the two mold halves has an opening leading into the hollow space.

10. The tool according to claim 9, wherein the opening faces the side facing away from the mold cavity.

11. The method according to claim 1, wherein the mold comprises a plurality of hollow spaces connected to one another for fluidic communication.

12. The tool according to claim 1, wherein the at least one hollow space has a shaped element for position and/or fixing a trimming body in the at least one hollow space.

13. The tool according to claim 1, wherein the at least one hollow space has a latching element for position and/or fixing a trimming body in the at least one hollow space.

14. The tool according to claim 1, wherein the mold comprises a plurality of hollow spaces connected to each other through openings in the at least one support.

15. The tool according to claim 1, wherein the mold further comprises a connection for vacuum and/or compressed air to the at least one hollow space.

16. The tool according to claim 1, wherein at least a partial volume of the at least one hollow space is bounded by a cover.

17. The tool according to claim 16, wherein the cover is mounted with variable height.

18. The tool according to claim 1, wherein the mold further comprises a trimming body removeably placed in the at least one hollow space.

19. The tool according to claim 18, wherein the trimming body is formed of plastic.

20. The tool according to claim 1, wherein the mold further comprises a connection plate mounted between one of the capacitor plates and one of the mold halves.

* * * * *